US009601775B2

United States Patent
Fukumine et al.

(10) Patent No.: US 9,601,775 B2
(45) Date of Patent: Mar. 21, 2017

(54) BINDER COMPOSITION FOR SECONDARY BATTERY POSITIVE ELECTRODE, SLURRY COMPOSITION FOR SECONDARY BATTERY POSITIVE ELECTRODE, SECONDARY BATTERY POSITIVE ELECTRODE, AND SECONDARY BATTERY

(71) Applicant: ZEON CORPORATION, Tokyo (JP)

(72) Inventors: Mayumi Fukumine, Tokyo (JP); Kei Kobayashi, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 221 days.

(21) Appl. No.: 14/360,887

(22) PCT Filed: Nov. 28, 2012

(86) PCT No.: PCT/JP2012/080698
§ 371 (c)(1),
(2) Date: Sep. 15, 2014

(87) PCT Pub. No.: WO2013/080989
PCT Pub. Date: Jun. 6, 2013

(65) Prior Publication Data
US 2015/0050554 A1 Feb. 19, 2015

(30) Foreign Application Priority Data

Nov. 28, 2011 (JP) .................. 2011-258637
Nov. 28, 2011 (JP) .................. 2011-258638
Jan. 30, 2012 (JP) .................. 2012-017060

(51) Int. Cl.
*H01M 4/62* (2006.01)
*H01M 4/139* (2010.01)
*H01M 4/04* (2006.01)
*H01M 10/0525* (2010.01)

(52) U.S. Cl.
CPC .......... *H01M 4/622* (2013.01); *H01M 4/0404* (2013.01); *H01M 4/0416* (2013.01); *H01M 4/139* (2013.01); *H01M 10/0525* (2013.01); *H01M 2220/30* (2013.01); *Y02P 70/54* (2015.11)

(58) Field of Classification Search
None
See application file for complete search history.

(56) References Cited

U.S. PATENT DOCUMENTS

| 2004/0020763 | A1 | 2/2004 | Kanzaki et al. |
| 2006/0228627 | A1 | 10/2006 | Nakayama et al. |
| 2012/0183848 | A1* | 7/2012 | Kang .................... H01M 4/622 |
| | | | 429/211 |

FOREIGN PATENT DOCUMENTS

| JP | 8-157677 A | 6/1996 |
| JP | 11-288720 A | 10/1999 |
| JP | 11-297328 A | 10/1999 |
| JP | 2003-223895 A | 8/2003 |
| JP | 2012-256541 A | 12/2012 |
| WO | WO 02/39518 A1 | 5/2002 |
| WO | WO 2004/095613 A1 | 11/2004 |
| WO | WO 2011/002057 A1 | 1/2011 |
| WO | WO 2011/078212 A1 | 6/2011 |
| WO | WO 2011/105687 * | 9/2011 |

OTHER PUBLICATIONS

Specification Sheet for Ethylene glycol dimethacrylate. From www.sigmaaldrich.com. Retrieved Jul. 7, 2016.*
International Preliminary Report on Patentability dated Jun. 3, 2014, issued in PCT/JP2012/080698 (Forms PCT/IB/373, PCT/ISA/237).
International Search Report issued in PCT/JP2012/080698 mailed Mar. 12, 2013.

* cited by examiner

Primary Examiner — Alix Eggerding
(74) Attorney, Agent, or Firm — Birch, Stewart, Kolasch & Birch, LLP

(57) ABSTRACT

Provided are a binder composition which has high electrolyte resistance characteristics, and a secondary battery which uses a positive electrode using the binder composition for high-temperature cycle characteristics. [Solution] The binder composition for the secondary battery positive electrode according to the present invention contains a polymerized unit which contains a nitrile group; a polymerized unit of (meth) acrylic acid ester; a polymerized unit which contains a hydrophilic group; and a polymerized unit of linear alkylene having a carbon number of at least four. In a mixed solvent in which a volume ratio EC:DEC between ethylene carbonate (EC) and diethyl carbonate (DEC) at 20° C. is 1:2, a degree of swelling with respect to an electrolyte in which $LiPF_6$ is dissolved to have a concentration of 1.0 mol/L is between 100% and 500%.

22 Claims, No Drawings

BINDER COMPOSITION FOR SECONDARY BATTERY POSITIVE ELECTRODE, SLURRY COMPOSITION FOR SECONDARY BATTERY POSITIVE ELECTRODE, SECONDARY BATTERY POSITIVE ELECTRODE, AND SECONDARY BATTERY

TECHNICAL FIELD

The present invention relates to the binder composition for the secondary battery positive electrode which is used for forming the positive electrode used in the secondary battery such as lithium ion secondary battery or so.

BACKGROUND ART

Recently, the portable terminals such as laptop computer, mobile phone and PDA become are widely used. For secondary batteries used for power sources of these portable terminals, nickel hydrogen secondary battery, lithium ion secondary battery or so are heavily used. The portable terminals are rapidly downsized, made thinner, have become lighter, and has higher performance. As a result, the portable terminals are used in various occasions. Also, for the battery, it is required to be downsized, made thinner, to be lighter and to have higher performance.

As for the positive electrode active material which is the constitution material of the lithium ion secondary battery, the active material comprising the transition metal such as iron, manganese, cobalt, chromium and copper or so are used. When the charge-discharge are repeated in the secondary battery using these active material, the transition metal ions elutes out to the electrolytic solution, and as a result, the battery capacity or the cycle characteristic may declines in some cases, which has become a significant problem.

Also, as the transition metal eluted from the positive electrode is deposited at the negative electrode surface by reduction, thereby the dendritic metal deposition is formed. As a result, this damages the separator, and the safety of the battery declines which has become a significant issue as well.

The electrodes used in the lithium ion secondary battery usually has a structure wherein the electrode active material layer is stacked on the current collector; and at the electrode active material layer, besides the electrode active material, the polymer binder (it may be referred as "binder" in below) which binds the electrode active materials with each other, and also the electrode active material and the current collector is used. The electrode is usually produced by obtaining the slurry composition by mixing the binder composition, wherein the polymer which becomes the binder to the liquid solvent such as the water or the organic liquid or so is dispersed or dissolved, with the active material and the conductive agent such as conductive carbon or so if needed; then this slurry composition is coated on the current collector, then dried thereby the electrode is produced.

In the polymer binder, particularly as the polymer binder of the positive electrode, a fluorine based polymer such as polyvinylidene fluoride has been preferably used since it is difficult to dissolve against the organic electrolytic solution.

However, fluorine based polymer such as polyvinylidene fluoride has week adhesive force against the current collector, and there was a problem that battery capacity declines due to the deterioration of the electrical connection between the electrode active material layer and the current collector by repeating the charge-discharge. Also, if the amount of the fluorine based polymer such as polyvinylidene fluoride is increased in order to enhance the adhesive force with the current collector, the internal resistance of the battery increased which causes the capacity to decline.

Also, it has been proposed to use the fluorine based polymer such as polyvinylidene fluoride (PVDF) and hydrogenated acrylonitrile-butadiene rubber (H-NBR) together (the patent document 1 and the patent document 2).

According to the patent documents 1 and 2, by using the binder including the PVDF and H-NBR, the cycle characteristic and the output characteristic of the secondary battery improves.

PRIOR ART DOCUMENT

Patent document 1: JP Patent Application Laid Open No.H09-63590
Patent document 2: JP Patent Application Laid Open No. 2005-123047

SUMMARY OF THE INVENTION

Technical Problems to be Solved by the Invention

However, according to the keen study by the present inventors, in the patent document 1, in order to increase the binding force of the binder to the degree which can obtain sufficient cycle characteristic, the content ratio of the binder in the electrode active material layer needs to be 2 wt % or more. Particularly, in case of using the electrode active material having small particle diameter and large specific area, more binder is necessary since the area which binds with the binder increases. Thus, the resistance of the electrode increases since the amount of the binder which is the insulation component increases; hence there is a risk that the output characteristic and the cycle characteristic both deteriorate.

Also, in case the binder proposed in the patent documents 1 and 2 are used, the dispsersiblity of the conductive agent and the electrode active material is insufficient, and the stability of the slurry composition forming the electrode active material layer is poor, thus it is difficult to obtain the smooth electrode.

Further, during the operation under high temperature, the binder expands against the electrolytic solution, hence the electron network is cut, as a result, the internal resistance of the electrode increases, and the cycle characteristic, particularly the cycle characteristic at high temperature (hereinafter, it may be referred as "high temperature cycle characteristic") may be deteriorated.

In view of such situation, the object of the present invention is to provide the binder composition having excellent binding property even in a small amount and showing excellent electrolytic solution resistance; the slurry composition showing excellent stability; the positive electrode having high smoothness, binding property, and electrolytic solution; and the secondary battery having excellent cycle characteristic (particularly, the high temperature characteristic).

The gists of the present invention aiming to solve such objects are as follows.

[1] A binder composition for the secondary battery positive electrode comprising a binder including a polymer unit having nitrile group, (meth)acrylate polymer unit, a polymer unit having hydrophilic group, and a polymer unit of linear alkylene having carbon atoms of 4 or more; wherein, a swelling degree of said binder in an electrolytic solution dissolved with $LiPF_6$ of a concentration of 1.0 mol/L in a mixture solution formed by mixing ethylene carbonate (EC) and diethyl carbonate (DEC) having the volume ratio at 20° C. of EC:DEC=1:2 is 100 to 500%.

[2] The binder composition for the secondary battery positive electrode as set forth in [1], wherein a content ratio of said (meth)acrylate polymer unit is 5 to 50 wt %.

[3] The binder composition for the secondary battery positive electrode as set forth in [1] or [2], wherein a content ratio of said polymer unit having nitrile group is 2 to 50 wt %.

[4] The binder composition for the secondary battery positive electrode as set forth in any one of [1] to [3], wherein a content ratio of said polymer unit having hydrophilic group is 0.05 to 20 wt %.

[5] The binder composition for the secondary battery positive electrode as set forth in any one of [1] to [4], wherein carbon atoms of alkyl groups bonding with a non-carbonyl oxygen atom of said (meth)acrylate polymer unit is 4 to 10.

[6] The binder composition for the secondary battery positive electrode as set forth in any one of [1] to [5], wherein a solubility parameter (SP value) of said binder is 9.0 $(cal/cm^3)^{1/2}$ or more and less than 11 $(cal/cm^3)^{1/2}$.

[7] The binder composition for the secondary battery positive electrode as set forth in any one of [1] to [6], wherein an iodine value of said binder is 3 to 60 mg/100 mg.

[8] The binder composition for the secondary battery positive electrode as set forth in any one of [1] to [7], wherein a glass transition temperature of said binder is 25° C. or less.

[9] A slurry composition for the secondary battery positive electrode comprising a positive electrode active material and the binder composition for the secondary battery electrode as set forth in any one of [1] to [8].

[10] A secondary battery positive electrode wherein the positive electrode active materials made of the slurry composition for the secondary battery positive electrode as set forth in [9] is formed on a current collector.

[11] A secondary battery comprising a positive electrode, a negative electrode and an electrolytic solution, wherein and said positive electrode is the secondary battery positive electrode as set forth in [10].

[12] A production method of a secondary battery positive electrode comprising steps of coating and drying the slurry composition for the secondary battery as set forth in [9] on at least to one face of the current collector.

Effect of the Present Invention

By using the binder composition of the present invention, the slurry composition for forming the electrode positive layer having excellent stability can be obtained. Also, since the positive electrode active material disperses uniformly in the positive electrode active material layer, the positive electrode having high smoothness, the binding property, and the electrolytic solution resistance can be obtained. As a result, the secondary battery using said positive electrode has excellent high temperature cycle characteristic.

THE MODE TO CARRY OUT THE INVENTION

The Binder Composition for the Secondary Battery Positive Electrode

The binder composition for the secondary battery of the present invention (it may be referred as "the binder composition for the positive electrode") comprises particular binder.

(The Binder)

Said binder comprises the polymer unit having the nitrile group, (meth)acrylate polymer unit, the polymer unit having the hydrophilic group, and the polymer unit of linear alkylene having carbon atoms of 4 or more; and the swelling degree against an electrolytic solution (the solution dissolved with $LiPF_6$ at a concentration of 1.0 mol/L in a mixture solvent formed by mixing ethylene carbonate (EC) and diethyl carbonate (DEC) so that the volume ratio at 20° C. is EC:DEC=1:2) is 100 to 500%.

By including (meth)acrylate polymer unit in the polymer constituting said binder, in the slurry composition for the secondary battery positive electrode for forming the positive electrode active material layer (hereinafter it may be referred as "slurry composition for the positive electrode"), the binder dissolves, and the slurry composition for the positive electrode having high stability can be obtained. Further, it has high stability against the electrolytic solution, and particularly it has excellent high temperature cycle characteristic.

Also, the binder includes preferably 5 to 50 wt %, more preferably 10 to 40 wt %, and particularly preferably 20 to 35 wt % of (meth)acrylate polymer unit. In case the content ratio of (meth)acrylate polymer unit is less than 5 wt %, the solubility against the dispersion medium declines, and the dispersibility may deteriorate as the active material cannot be uniformly dispersed in the slurry composition for the positive electrode. Therefore, it may become the cause of decline of the slurry stability, the uniformity of the secondary battery positive electrode and the cycle characteristic of the secondary battery. Also, in case the content ratio of (meth)acrylate polymer unit exceeds 50 wt %, the strength of the secondary battery positive electrode declines, and the swelling degree against the electrolytic solution increases, and the electrode flexibility may be deteriorated. Further, it may become the cause of the decline of the cycle characteristic of the secondary battery. By setting the content ratio of (meth)acrylate polymer unit in the binder within said range, the binder dissolves in the dispersion medium (for example, N-methylpyrrolidone, hereinafter it may be referred as "NMP") of the slurry composition for the positive electrode or the dispersion medium of the binder which will be described in the following, thus the slurry composition for the positive electrode having high stability can be obtained. Further, the stability against the electrolytic solution is high, and particularly the high temperature cycle characteristic is excellent.

Also, the carbon atoms of the alkyl group bonded to the non-carbonyl oxygen atom of said (meth)acrylate polymer is preferably 2 to 12, more preferably 4 to 12, further preferably 4 to 10. By having the carbon numbers of the alkyl group bonded to the non-carbonyl oxygen atom of said (meth)acrylate polymer within said range, the binder scarcely elutes out to the electrolytic solution, and the obtained slurry composition for the positive electrode has high slurry stability. Further, the obtained electrode has high uniformity and has excellent flexibility.

By including the polymer unit having the hydrophilic group in the polymer of said binder, the positive electrode active material can be dispersed stably in the slurry composition for the positive electrode, hence the slurry stability of the slurry for the positive electrode improves, and thus the gelation of the slurry composition for the positive electrode can be prevented.

Also, the binder includes preferably 0.05 to 20 wt %, more preferably 0.05 to 10 wt %, further preferably 0.1 to 8 wt %, and particularly preferably 1 to 6 wt % of polymer unit having the hydrophilic group. In case the content ratio of said polymer unit having the hydrophilic group is 0.05 wt % or less, the binding property between the positive electrode active materials against each other, and the positive electrode and the current collector which will be described in following may decline, and a part of the positive electrode active material layer may fall off during the production steps such as the winding or pressing of the positive electrode (hereinafter, it may be referred as "powder fall off"), and it may damage the separator or may cause a short circuit between the positive electrode and the negative electrode. Also, in case the content ratio of said polymer unit having the hydrophilic group exceeds 20 wt %, the viscosity of the slurry composition for the positive electrode may increase significantly since the mutual interaction between the binder and the active material is too strong. Also, the polymer stability during the binder production is poor, and the gelation tends to occur easily, thus the dispersibility declines as the positive electrode active material cannot be dispersed uniformly in the slurry composition for the positive electrode.

Thus, by setting the content ratio of the polymer unit having the hydrophilic group in the binder within the above mentioned range, the binding property between the positive electrode active materials against each other, and the positive electrode active material layer and the following described current collector improves, thus the part of the positive electrode active material can be suppressed from falling off (the powder fall off) during the production step of the positive electrode. According to such binder, the slurry composition for the positive electrode with high stability can be obtained; further the binding property of the electrode to the current collector is improved, and shows excellent high temperature characteristic.

The hydrophilic group of the present invention refers to the salt wherein the functional group which releases the proton in the aqueous solution or the proton of said functional group is substituted with the cation; and specifically, carboxylic acid group, sulfonic acid group, phosphoric acid group, hydroxyl group and the salts thereof or so may be mentioned.

Also, by including the polymer unit having the nitrile group in the polymer constituting said binder, the dispersibility of the positive electrode active material in the slurry composition for the positive electrode improves, thus the slurry composition for the positive electrode can be stored in a stable condition for long period of time. As a result, the uniform positive electrode active material layer can be produced easily. Also, the conductivity of the lithium ion becomes good, the internal resistivity in the battery becomes small, and the output characteristic of the battery can be improved.

The content ratio of the polymer unit having the nitrile group is preferably 2 to 50 wt %, more preferably 2 to 30 wt %, further preferably 10 to 30 wt %, and particularly 10 to 25 wt %. In case the content ratio of the polymer unit having the nitrile group is less than 2 wt %, the solubility to NMP and the dispersibility of the positive electrode active material declines, and the slurry stability declines. As a result, the cycle characteristic of the secondary battery deteriorates. Also, in case the content ratio of the polymer unit having the nitrile group exceeds 50 wt %, the solubility to the electrolytic solution increases, and the cycle characteristic of the secondary battery may deteriorate. By having the polymer unit having the nitrile group in the binder within the above mentioned range, the dispersibility of the positive electrode active material improves, and slurry composition for the positive electrode having high stability can be obtained. As a result, the uniformity of the secondary battery positive electrode becomes excellent. Also, since the stability against the electrolytic solution becomes excellent, the cycle characteristic, particularly the high temperature cycle characteristic becomes excellent.

Also, by including the polymer unit of linear alkylene having carbon atoms of 4 or more in the polymer constituting said binder, the dispersibility of the conductive agent in the slurry composition for the positive electrode improves, and the production of the uniform secondary battery positive electrode becomes easy. As the positive electrode active material and the conductive agent or so are dispersed uniformly in the electrode, the internal resistance decreases, and as a result, the high temperature cycle characteristic and the output characteristic of the battery using this electrode improves. Further, by introducing the linear alkylene polymer unit, the swelling degree of the binder against the electrolytic solution is adjusted, and the battery characteristic is improved.

The content ratio of the above mentioned linear alkylene polymer unit is preferably 20 to 98 wt %, more preferably 20 to 80 wt %, and particularly preferably 20 to 70 wt %.

The carbon atoms of the above mentioned linear alkylene polymer unit is 4 or more, preferably 4 to 16, and further preferably 4 to 12.

As mentioned in the above, the binder used in the present invention comprises; the polymer unit having the nitrile group; (meth)acrylate polymer unit; the polymer unit having the hydrophilic group; and the polymer unit of linear alkylene group having carbon atoms of 4 or more. Such binder is obtained by carrying out the polymerization reaction of the monomer capable of forming the polymer unit having the nitrile group, the monomer capable of forming the polymer unit having the hydrophilic group, the monomer capable of forming (meth)acrylate polymer unit, and the monomer capable of forming the polymer unit of the linear alkylene having carbon atoms of 4 or more. Note that, the polymer unit of the linear alkylene having carbon atoms of 4 or more can be formed by carrying out the hydrogenation reaction after obtaining the polymer comprising the structural unit having the unsaturated bond (the polymer unit capable of forming the conjugated diene monomer having the carbon atoms o 4 or more).

Hereinafter, the production method of the binder used in the present invention will be explained. As the monomer capable of forming the polymer unit having the nitrile group, α,β-ethylene unsaturated nitrile monomer may be mentioned. As α,β-ethylene unsaturated nitrile monomer, it is not particularly limited as long as it is α,β-ethylene unsaturated compound having the nitrile group, and for example acrylonitrile; α-halogeno acrylonitrile such as α-chloro acrylonitrile, α-bromoacrylonitrile; α-alkylacrylonitrile such as methacrylonitrile or so may be mentioned. Among these, acrylonitrile or methacrylonitrile or so is preferable. These may be used alone or by mixing plurality thereof.

The introduction of the hydrophilic group to the binder is carried out by polymerizing the monomer comprising the carboxylic acid group, the sulfonic acid group, the phosphoric acid group and the hydroxyl group, and the salts thereof or so.

As the monomer comprising the carboxylic acid group, monocarboxylic acid and the derivative thereof, dicarboxylic acid and the derivative thereof or so may be mentioned.

As monocarboxylic acid, acrylic acid, methacrylic acid, crotonic acid or so may be mentioned.

As the derivative of monocarboxylic acid, 2-ethylacrylic acid, isocrotonic acid, α-acetoxy acrylic acid, β-trans-aryloxy acrylic acid, α-chloro-β-E-methoxy acrylic acid, β-diamino acrylic acid or so may be mentioned.

As dicarboxylic acid, maleic acid, fumaric acid, itaconic acid or so may be mentioned.

As the dicarboxylic acid derivative, methyl allyl maleate such as methylmaleic acid, dimethyl maleic acid, phenylmaleic acid, chloromaleic acid, dichloromaleic acid, fluoromaleic acid; maleic acid esters such as diphenyl maleate, nonyl maleate, decyl maleate, dodecyl maleate, octadecyl maleate, and fuluoroalkyl maleate may be mentioned.

Also, acid anhydride which generates the carboxylic acid group by hydrolysis can be used as well. As acid anhydride of the dicarboxylic acid, maleic acid anhydride, acrylic acid anhydride, methyl acrylic acid anhydride, dimethyl acrylic acid anhydride, or so may be mentioned.

Other than these, monoesters and diesters of α, β-ethylene unsaturated polyvalent carboxylic acid such as monoethyl maleate, diethyl maleate, monobutyl maleate, dibutyl maleate, monoethyl fumarate, diethyl fumarate, monobutyl fumarate, dibutyl fumarate, monocyclohexyl fumarate, dicyclohexyl fumarate, monoethyl itaconate, diethyl itaconate, monobutyl itaconate, dibutyl itaconate or so may be mentioned.

As the monomer having the sulfonic group; vinyl sulfonate, methylvinyl sulfonate, (meth)allyl sulfonate, styrene sulfonate, (meth)acrylic acid-2-ethylsulfonate, 2-acrylamide-2-methylpropane sulfonate, 3-allyloxy-2-hydroxypropane sulfonate or so may be mentioned.

As the monomer having the phosphoric group, 2-(meth)acryloyloxyethyl phosphate, methyl-2-(meth)acryloyloxyethyl phosphate, ethyl-(meth)acryloyloxyethyl phosphate or so may be mentioned.

As the monomer having the hydroxyl group, unsaturated ethylene alcohol such as (meth)allyl alcohol, 3-butene-1-ol and 5-hexene-1-ol; ester alcanol of unsaturated ethylene carboxylic acid such as 2-hydroxyethyl-acrylate, 2-hydroxypropyl-acrylate, 2-hydroxyethyl-methacrylate, 2-hydroxypropyl-methacrylate, di-2-hydroxyethyl-malate, di-4-hydroxybutyl-malate, and di-2-hydroxypropyl-itaconate; esters of polyalkyleneglycol and (meth)acrylate expressed by general formula of $CH_2=CR^1-COO-(C_nH_{2n}O)_m-H$ (m is integers of 2 to 9, n is integers of 2 to 4, and $R^1$ indicates hydrogen or methyl group); mono(meth)acrylates of dihydroxyester of the dicarboxylic acid such as 2-hydroxyethyl-2'-(meth)acryloyl oxyphthalate, 2-hydroxyethyl-2'-(meth)acryloyloxy succinate; vinyl ethers such as 2-hydroxyethyl vinyl ether, 2-hydroxypropyl vinyl ether or so; mono(meth)allyl ether of alkylene glycol such as (meth)allyl-2-hydroxy ethyl ethers, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; polyoxyalkylene glycol (meth)monoallyl ether such as diethylene glycol mono(meth)allyl ether, diproplyene glycol mono(meth)allyl ether; and mono(meth)allyl ether of halogenated hydroxyl substitute of the polyalkyleneglycol such as glycerin mono(meth)allyl ether, (meth)allyl-2-chloro-3-hydroxypropyl ether, and (meth)allyl-2-hydroxy-3-chloropropyl ether or so; mono(meth)allyl ether of the polyvalent phenol and the halogen substitute thereof such as eugenol and isoeugenol; (meth)allyl thioether of alkylene glycol such as (meth)allyl-2-hydroxyethyl thioether and (meth)allyl-2-hydroxypropyl thioether; or so may be mentioned. Among these, the hydrophilic group is preferably the carboxylic acid group or the sulfonic acid group since the binding property between the positive electrode active materials with each other, and the binding property of the positive electrode active material layer and the current collector which will be described in the following are excellent; and further preferably it is carboxylic acid group since the transition metal which may elute out from the positive electrode active material can be captured efficiently.

The introduction method of the linear alkylene polymer unit into the binder is not particularly limited; however it is preferably the method carrying out the hydrogenation reaction after introducing the polymer unit capable of forming the conjugated diene monomer, since it is easy.

As the conjugated diene monomer, the conjugated diene monomer having the carbon atoms of 4 or more is preferable, and for example 1,3-butadiene, isoprene, 2,3-dimethyl-1,3-butadiene, 1,3-pentadiene or so may be mentioned. Among these, 1,3-butadiene is preferable. These may be used alone or by mixing plurality thereof.

As the monomer capable of forming the (meth)acrylate polymer unit; acrylic acid alkyl ester such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, 2-ethylhexyl acrylate, nonyl acrylate, decyl acrylate, lauryl acrylate, n-tetradecyl acrylate, stearyl acrylate or so; methacrylic acid alkyl ester such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, stearyl methacrylate or so may be mentioned.

Among these, acrylic acid alkyl ester having the alkyl group of the carbon atoms of 4 to 10 which bonds with the non-carbonyl oxygen atom is preferable; since it shows solubility to NMP preferably used as the dispersion medium of the slurry composition for the positive electrode without eluting to the electrolytic solution, and it can improve the flexibility of the positive electrode and suppress the peel off of the positive electrode when making the winding cell; further the characteristic (the cycle characteristic or so) of the secondary battery using said positive electrode is excellent. Among these, specifically, butyl acrylate, 2-ethylhexyl acrylate and lauryl acrylate are more preferable; and further preferably it is butyl acrylate, 2-ethylhexyl acrylate.

Also, besides the above mentioned polymer unit, the binder used for the present invention may comprise other polymer unit of the monomer capable of copolymerizing with the monomer forming these polymer unit. The content ratio of such polymer unit of other monomer is preferably 30 wt % or less, more preferably 20 wt % or less, further preferably 10 wt % or less with respect to entire monomer unit.

As other monomer capable of copolymerizing, for example; aromatic vinyl compound such as styrene, α-methylstyrene, vinyl toluene or so; fluorine containing vinyl compound such as fluoroethylvinyl ether, fluoropropylvinylether, o-trifluoromethyl styrene, vinyl pentafluorobenzoic acid, difluoroethylene, tetrafluoro ethylene or so; non-conjugated diene compound such as 1,4-pentadiene, 1,4-hexadiene, vinylnorbornene, dicyclopenta diene or so; α-olefin compound such as ethylene, propylene, 1-butene, 4-methyl-1-pentene, 1-hexene, 1-octene or so; alkoxy alkylester of α, β-ethylene unsaturated carboxylic acid such as methoxyethyl(meth)acrylate, methoxypropyl(meth)acrylate, butoxyethyl(meth)acrylate or so; divinyl compound such as divinyl benzene or so; di(meth)acrylates such as ethylene di(meth)

acrylate, diethyleneglycol di(meth)acrylate, ethylene glycol di(meth)acrylate or so; trimethacrylates such as trimethylolpropanetri(meth)acrylate or so; polyfunctional ethylene unsaturated monomer, self-crosslinking compounds such as N-methylol(meth)acrylamide, N-N'-dimethylol(meth)acrylamide or so may be mentioned.

Among these, an aromatic vinyl compound such as styrene, α-methylstyrene or so are preferable, since it shows solubility towards NMP without eluting out to the electrolytic solution when using NMP as the dispersion medium of the slurry composition for the positive electrode, and having excellent dispersibility of the positive electrode active material and enables to obtain uniform positive electrode.

Further the binder used in the present invention may include, besides the above mentioned monomer component, the monomer copolymerizable therewith. As the monomer copolymerizable therewith, vinyl esters such as vinyl acetate, vinyl propionate, vinyl lactate or so; vinylethers such as methyl vinyl ether, ethyl vinyl ether, butyl vinyl ether or so; vinyl ketones such as methyl vinyl ketone, ethyl vinyl ketone, butyl vinyl ketone, hexyl vinyl ketone, isopropenyl vinyl ketone or so; heterocyclic containing vinyl compound such as N-vinyl pyrrolidone, vinylpyridine, vinyl imidazol or so may be mentioned. The binder of said constitution can be obtained by carrying out the graft copolymerization of these monomers by appropriate means.

The binder used in the present invention is used in a condition of the dispersion solution or the solution in which said binder is dispersed or dissolved in the dispersion medium (hereinafter, these may be referred as "the binder dispersion solution" in total). As the dispersion medium, it is not particularly limited, as long as the binder can be dispersed or dissolved uniformly. In the present invention, water is preferably used as the dispersion medium as it is excellent from the environmental point and as it can be dried very fast. Also, as the organic solvent, cyclic aliphatic hydrocarbons such as cyclopentane and cyclohexane or so; aromatic hydrocarbons such as toluene, xylene and ethylbenzene or so; ketones such as acetone, ethylmethylketone, diisopropylketone, cyclohexanone, methylcyclohexane, ethylcyclohexane or so; chlorinated aliphatic hydrocarbons such as methylenechloride, chloroform, carbon tetrachloride or so; esters such as ethyl acetate, butyl acetate, γ-butyrolactone and ε-caprolactone; acylonitriles such as acetonitrile and propionitrile or so; ethers such as tetrahydrofuran and ethylene glycol diethyl ether or so; alcohols such as methanol, ethanol, isopropanol, ethylene glycol and ethylene glycol monomethyl ether or so; amides such as N-methyl pyrrolidone and N,N-dimethyl formamide or so may be mentioned.

These dispersion mediums can be used alone or by mixing two or more thereof. Among these, water, N-methyl pyrrolidone, cyclohexanone, or toluene or so are preferable, since it is used industrially when producing the slurry composition for the positive electrode which will be described in below, it hardly evaporate during the production, and as a result, the evaporation of the slurry composition for the positive electrode is suppressed, and the smoothness of the obtained positive electrode is enhanced.

In case the binder is dispersed in the dispersion medium in a particle form, the average particle diameter (the dispersed particle diameter) of the binder dispersed in a particle form is preferably 50 to 500 nm, more preferably 70 to 400 nm, and particularly preferably 100 to 250 nm. When the particle diameter of the binder is within this range, the strength and the flexibility of the obtained positive electrode becomes excellent.

In case the binder is dispersed in the dispersion medium in a particle form, the solid portion concentration of the binder dispersion solution is usually 15 to 70 wt %, preferably 20 to 65 wt %, and more preferably 30 to 60 wt %. When the solid portion concentration is within this range, the processing during the production of the slurry composition for the positive electrode which will be described in below is excellent.

The glass transition temperature (Tg) of the binder used in the present invention is preferably 25° C. or less, more preferably 15° C. or less, and particularly preferably 0° C. or less. The lower limit of Tg of the binder is not particularly limited, however it is preferably −50° C. or higher, more preferably −45° C. or higher, and particularly preferably −40° C. or higher. By having the Tg of the binder within said range, the secondary battery positive electrode of the present invention has excellent strength and flexibility, thus the powder fall off during the production steps of the positive electrode is suppressed, and the high temperature cycle characteristic of the secondary battery using said positive electrode can be improved. Note that, the glass transition temperature of the binder can be regulated by the combination of various monomers.

Also, the swelling degree of the binder against the electrolytic solution which will be described in below is 100 to 500%, preferably 110 to 400%, more preferably 120 to 300%. By having the swelling degree of the binder within the above range, the solubility of the binder against the electrolytic solution can be suppressed, hence the binding property of the binder becomes excellent, and the high temperature cycle characteristic of the secondary battery can be improved.

Here, as the swelling degree, the swelling degree in a solution dissolved with $LiPF_6$ at a concentration of 1.0 mol/L in a mixture solvent formed by mixing ethylene carbonate (EC) and diethyl carbonate (DEC) having the volume ratio at 20° C. of EC:DEC=1:2 is used.

If the swelling degree of the binder in the electrolytic solution is less than 100%, the binder may not sufficiently include the electrolytic solution in the secondary battery positive electrode. Usually, the binder includes the electrolytic solution in the electrode, thereby the binder itself shows Li conductivity; however in case the binder does include in the electrolytic solution, then the binder itself will not be Li conduction passage and the resistance increases; hence as a result the cycle characteristic and the output characteristic of the secondary battery using such electrodes may decline. Also, in case the swelling degree of said binder in the electrolytic solution exceeds 500%, the binder is excessively swollen by the electrolytic solution in the secondary battery electrode, hence the conductive network is cut and the resistance increases. As a result, the cycle characteristic and the output characteristic of the secondary battery using such electrodes may decline.

The swelling degree of the binder can be regulated within the above mentioned range by regulating the type and the ratio of the entire polymer unit constituting the binder. For example, for (meth)acrylate polymer unit, the method of regulating the length or so of the alkyl chain binding with non-carbonyl oxygen atom in the polymer unit may be mentioned.

The swelling degree of the binder can be regulated within the above mentioned range by regulating the type and the ratio of the entire polymer unit constituting the binder; however also the solubility parameter (hereinafter, it may be referred as "SP value") of the binder can be used as an index. For example, the method of using the polymer or the copolymer wherein the solubility parameter (hereinafter, it may be referred as "SP value") is preferably 9.0 $(cal/cm^3)^{1/2}$ or more and less than 11 $(cal/cm^3)^{1/2}$, more preferably 9 to 10.5 $(cal/cm^3)^{1/2}$, and further preferably 9.5 to 10 $(cal/cm^3)^{1/2}$ or so may be mentioned. By having the SP value within said range, a suitable swelling property to the electrolytic solution can be provided while maintaining the solubility to the dispersion medium of the binder or the dispersion medium of the slurry composition for the positive electrode. Thereby the uniformity of the obtained secondary battery positive electrode and the cycle characteristic of the secondary battery using thereof can be improved.

Here, the SP value can be obtained in accordance with the method recited in J. Brandrup, E. H. Immergut and E. A. Grulk "Polymer Handbook" VII Solubility Parameter Values, p 675-714 (John Wiley & Sons, The fourth edition issued on 1999). For those which is not described in this publication, it can be determined in accordance with a "molecular attraction constant method" proposed by Small. In this method, the SP value of a compound is determined from the following formula using the molecular volume of the molecule of the compound and the sum of molecular attraction constants (G), which are characteristic values of the functional groups (atomic groups) constituting the molecule of the compound.

$$\delta = \Sigma G/V = d\Sigma G/M$$

$\Sigma G$: the sum of the molecular attraction constants G
V: the specific volume
M: the molecular weight
d: the specific gravity The iodine value of said binder is preferably 3 to 60 mg/100 mg or so, more preferably 3 to 20 mg/100 mg, further preferably 7 to 15 mg/100 mg, and particularly preferably 8 to 10 mg/100 mg. If the iodine value of the binder exceeds 60 mg/100 mg, the oxidation potential is low due to the unsaturated bond included in the binder, and the long term cycle characteristic of the battery may be poor. On the other hand, if the iodine value of the binder is less than 3 mg/100 mg, the flexibility of the binder declines. As a result, the powder fall off occurs, and the safety and the long term characteristic are deteriorated. By having the iodine value of the binder within the above mentioned range, the binder has stable chemical structure against the high electrical potential; thus the electrode structure can be maintained over long term cycle and has excellent high temperature characteristic. The iodine value is obtained in accordance with JIS K6235; 2006.

The weight average molecular weight based on polystyrene standard of the binder used in the present invention which is determined by the gel permeation chromatography is preferably 10,000 to 700,000, more preferably 50,000 to 500,000, and particularly preferably 100,000 to 300,000. By having the weight average molecular weight of the binder within the above mentioned range, flexibility is provided to the positive electrode, and further the viscosity can be regulated so that it can be easily coated during the production of the slurry composition for the positive electrode.

The production method of the binder used in the present invention is not particularly limited, and any method of a solution polymerization method, a suspension polymerization method, a bulk polymerization method, and an emulsion polymerization method or so can be used. As for the polymerization reaction, any of an ionic polymerization, a radical polymerization, a living radical polymerization, or so can be used. As for the polymerization initiator used for the polymerization, for example, organic peroxides such as lauroyl peroxide, diisopropylperoxydicarbonate, di-2-ethylhexylperoxydicarbonate, t-butylperoxypivalate, 3,3,5-trimethylhexanoylperoxide or so, azo compounds such as α,α'-azobisisobutyronitrile, ammonium persulfate, potassium persulfate or so may be mentioned.

The linear alkylene polymer unit is formed by introducing the polymer unit capable of forming the conjugated diene monomer having carbon atoms of 4 or more, then carrying out the hydrogenation reaction. The method of hydrogenation reaction is not particularly limited. By carrying out the hydrogenation reaction, carbon-carbon unsaturated bond derived from the polymer unit capable of forming the conjugated diene is selectively hydrogenated among the unsaturated polymer (a polymer including a polymer unit having a nitrile group, (meth)acrylate polymer unit, polymer unit having hydrophilic group, and a polymer unit capable of forming the conjugated diene monomer) obtained by said polymerization method; thereby the binder used in the present invention can be obtained. Also, due to the hydrogenation reaction, the iodine value of the binder used in the present invention can be set to the above mentioned range. The binder used in the present invention is preferably the hydrogenated acrylonitrile butadiene copolymer (hereinafter, it may be referred as "hydrogenated NMR").

As for the selective hydrogenation method which selectively hydrogenates only the carbon-carbon unsaturated bond derived from the polymer unit capable of forming the conjugated diene monomer of the unsaturated polymer, it may be any of the known methods, an oil layer hydrogenation method, or an aqueous layer hydrogenation method; however since the content of the impurities in the obtained binder is low, the aqueous layer hydrogenation method is preferable.

In case the production of the binder used in the present invention is carried out by the oil layer hydrogenation method, it is preferably carried out by the following method. That is, first, the dispersion solution of the unsaturated polymer prepared by the emulsion polymerization is solidified by a salt out, followed by filtration then dissolved in the organic solvent. Next, the hydrogenation reaction (the oil layer hydrogenation method) was carried out for the unsaturated polymer dissolved in the organic solvent to form the hydride. Then, the obtained hydride solution is carried out with the solidification, filtration, and drying; thereby the binder used in the present invention is obtained.

Note that, in case of using alkaline metal caprate salt as the emulsifier, during the steps of solidification by the salt out of the dispersion solution of the unsaturated polymer, the filtration and the drying, the amount of the caprate salt in the obtained binder at the end is prepared to be 0.01 to 0.4 wt %. For example, during the solidification by the salt out of the dispersion solution, known solidifiers such as magnesium sulfate, sodium chloride, calcium chloride, aluminum sulfate or so can be used; however by preferably using the alkaline earth metal salts such as magnesium sulfate, magnesium chloride, magnesium nitrate or so; or the group 13 metal salt such as aluminum nitrate or so; the amount of the caprate salt comprised in the unsaturated polymer can be reduced. Therefore, as the solidifier, the alkaline earth metal salt or the group 13 metal salt are preferably used, and more preferably the alkaline earth metal salt is preferable. Further, by controlling the used amount and the solidifying temperature thereof, the amount of the caprate salt in the obtained binder at the end can be within the above mentioned range. The used amount of the solidifier is preferably 1 to 100 parts by weight, more preferably 5 to 50 parts by weight, and particularly preferably 10 to 50 parts by weight with respect to 100 parts by weight of the amount of the unsaturated polymer which is to be hydrogenated. The solidifying temperature is preferably 10 to 80° C.

As the solvent of the oil layer hydrogenation method, it is not particularly limited, as long as it is a liquid organic compound which dissolves the unsaturated polymer, benzene, toluene, xylene, hexane, cyclohexane, tetrahydrofuran, methylethylketone, ethyl acetate, cyclohexanone, and acetone or so may be used preferably.

As the catalyst for the oil layer hydrogenation method, it can be used without any limitation as long as it is known selective hydrogenation catalyst; and palladium based catalyst and rhodium based catalyst are preferable, more preferably it is palladium based catalyst (palladium acetate, palladium chloride and palladium hydroxide or so). Two or more thereof may be used together; however in case of using by combining rhodium based catalyst and palladium based catalyst, it is preferable that the palladium based catalyst is the main active component. These catalysts are usually used by being supported by the carrier. As for the carrier, silica, silica-alumina, alumina, diatom earth, active carbon or so may be mentioned. The used amount of the catalyst is preferably 10 to 5000 ppm, more preferably 100 to 3000 ppm in terms of the metal amount in the hydrogenated catalyst, with respect to the amount of the hydrogenated unsaturated polymer.

The hydrogenation reaction temperature of the oil layer hydrogenation method is preferably 0 to 200° C., more preferably 10 to 100° C., the hydrogen pressure is preferably 0.1 to 30 MPa, and more preferably 0.2 to 20 MPa; and the reaction time is preferably 1 to 50 hours and more preferably 2 to 25 hours.

Alternatively, in case of carrying out the aqueous hydrogenation method for the production of the binder used in the present invention, to the dispersion solution of the unsaturated polymer prepared by the emulsion polymerization, the water is added depending on the needs to dilute, then the hydrogenation reaction is preferably carried out.

Here, for the aqueous layer hydrogenation method, there are (I) an aqueous layer direct hydrogenation method wherein the hydrogenation is carried out by directly supplying the hydrogen to the reaction system under the presence of the hydrogenation catalyst; and (II) an aqueous layer indirect hydrogenation method wherein the hydrogenation is carried out by the reduction under the presence of the oxidizing agent, the reducing agent and the activator.

In (I) the aqueous layer direct hydrogenation method, the concentration of the unsaturated polymer in the aqueous layer (the concentration at the dispersion solution state) is preferably 40 wt % or less in order to prevent the aggregation.

Also, as the hydrogenation catalyst being used, it is not particularly limited as long as it is a compound which hardly decomposes by water. As the specific example of the hydrogenation catalyst, for the palladium catalyst, palladium salt of carboxylic acid such as formic acid, propionic acid, lauric acid, succinic acid, oleic acid futaric acid or so; palladium chlorides such as palladium chloride, dichloro(cyclooctadiene)palladium, dichloro(norbornadiene)palladium, ammonium hexachloropalladium (IV) acid or so; iodine compounds such as palladium iodide or so; palladium sulfate dehydrates or so may be mentioned. Among these, palladium salt of carboxylic acid, dichloro(norbornadiene)palladium, ammonium hexachloropalladium (IV) acid are particularly preferable. The used amount of the hydrogenated catalyst may be determined accordingly; however preferably it is 5 to 6000 ppm, and more preferably 10 to 4000 ppm in terms of metal amount of the hydrogenated catalyst with respect to the amount of the unsaturated polymer being hydrogenated.

The reaction temperature of the aqueous layer direct hydrogenation method is preferably 0 to 300° C., more preferably 20 to 150° C., and particularly preferably 30 to 100° C. If the reaction temperature is too low, the reaction speed may decline, and on the other hand, if it is too high, the side reaction such as the hydrogenation reaction of the nitrile group or so may occur. The hydrogen pressure is preferably 0.1 to 30 MPa, and more preferably 0.5 to 20 MPa. The reaction time is selected by taking the reaction temperature, the hydrogen pressure, and the target hydrogenation ratio or so into consideration.

On the other hand, in (II) the aqueous layer indirect hydrogenation method, the concentration of the unsaturated polymer of the aqueous layer (the concentration at the dispersion solution state) is preferably 1 to 50 wt %, and more preferably 1 to 40 wt %.

As for the oxidizing agent used in the aqueous layer indirect hydrogenation method, oxygen, air, hydrogen peroxide or so may be mentioned. The used amount of these oxidizing agents are preferably 0.1:1 to 100:1, more preferably 0.8:1 to 5:1 in terms of the mol ratio (the oxidizing agent:carbon-carbon double bond) against the carbon-carbon double bond.

The reducing agent used in the aqueous layer indirect hydrogenation method, hydrazines such as hydrazine, hydrazine hydrates, hydrazine acetate, hydrazine sulfuric acid salt, hydrazine hydrochloride salt or so, or the compound which releases hydrazine may be used. The used amount of these reducing agents are preferably 0.1:1 to 100:1, more preferably 0.8:1 to 5:1 in terms of the mol ratio (the reducing agent:carbon-carbon double bond) against the carbon-carbon double bond.

As the activator used in the aqueous layer indirect hydrogenation method, ions of the metals such as copper, iron, cobalt, lead, nickel, iron, tin or so may be used. The used amount of these activators are preferably 1:1000 to 10:1, and more preferably 1:50 to 1:2 in terms of the mol ratio (the activator:carbon-carbon double bond) against the carbon-carbon double bond.

The reaction in the aqueous layer indirect hydrogenation method is carried out by applying the heat within the range of 0° C. to the reflux temperature; thereby the hydrogenation reaction is carried out. The heating range at this time is preferably 0 to 250° C., more preferably 20 to 100° C., and particularly preferably 40 to 80° C.

In either case of the direct hydrogenation method or indirect hydrogenation method of the aqueous layer, it is preferable to carry out the solidification by salt out, filtration and the drying, after the hydrogenation. The salt out preferably uses, as similar to the salt out of the dispersion solution of the unsaturated polymer in said oil layer hydrogenation method, the above mentioned alkaline earth metals or the group 13 metal salts, in order to regulate the amount of the caprate salt in the binder after the hydrogenation reaction. Further preferably the alkaline earth metal salt is used. Also, following the solidification, the filtration and the drying step can be carried out by the known method.

Also, the production method of the binder used in the present invention is particularly preferably the method carrying out the hydrogenation method by dividing into two steps. Even if the same amount of the hydrogenation catalyst is used, by carrying out the hydrogenation reaction by dividing into two steps, the hydrogenation reaction efficiency can be enhanced. That is, when converting the polymer unit capable of forming the conjugated diene monomer to the linear alkylene structure unit, the iodine value of the binder can be made further lower.

In case of carrying out the hydrogenation reaction by dividing into two steps, it is preferable to achieve the hydrogenation reaction rate (hydrogenation rate) (%) of 50% or more, and more preferably 70% or more at the first step. That is, when the value obtained in the below formula is hydrogenation reaction rate (%), this value is preferably 50% or more, and more preferably 70% or more.

The hydrogenation reaction rate (hydrogenation rate) (%)=100×(the amount of the carbon-carbon double bond before the hydrogenation reaction− the amount of the carbon-carbon double bond after the hydrogenation reaction)/(the amount of the carbon-carbon double bond before the hydrogenation reaction)

Note that, the amount of the carbon-carbon double bond can be analyzed by using NMR.

After completing the hydrogenation reaction, the hydrogenation reaction catalyst in the dispersion solution is removed. As for this method, for example, the method of adding the absorbent such as the activated carbon, and the ion exchange resin or so to absorb the hydrogenation reaction catalyst while stirring, then filtering or centrifuging the dispersion solution or so may be used. It is also possible to not to remove the hydrogenation reaction catalyst and leave it in the dispersion solution.

Also, the binder used in the present invention comprises the polymer unit having the hydrophilic group. The method of introducing the polymer unit having the hydrophilic group in the binder is not particularly limited; and the method of introducing the hydrophilic group in the polymer constituting the binder during the production step of the above mentioned binder (the method of copolymerizing the monomer having the hydrophilic group); or the method of obtaining the polymer by carrying the hydrogenation reaction to the hydrogenated unsaturated polymer (hereinafter, it may be referred as "hydrogenated polymer") including the above mentioned polymer unit having the nitrile group, the above mentioned (meth)acrylate polymer unit, and the above mentioned polymer unit capable of forming the conjugated diene monomer, then mixing the hydrogenated polymer and ethylene based unsaturated carboxylic acid or the anhydride thereof (the method of carrying out the acid modification of the hydrogenated polymer) or so may be mentioned. Among these, the method of copolymerizing the monomer having the hydrophilic group is preferable as it is simple. Since the binder includes the hydrophilic group, the dispersibility of the positive electrode active material becomes excellent, and the uniform positive electrode can be obtained. Also, the resistance in the positive electrode is reduced; as a result, the secondary battery showing excellent cycle characteristic can be obtained. Further, the binding property between the current collector becomes good, and the positive electrode structure can be maintained even after repeating the charge and discharge, and excellent cycle characteristic can be obtained.

Hereinbelow, the method of producing the binder used in the present invention (hereinafter, it may be referred as "acid modification") by mixing the ethylene based unsaturated carboxylic acid or the anhydride thereof with the polymer after the hydrogenation reaction (the hydrogenated polymer) will be described (the method of carrying out the acid modification of the hydrogenated polymer).

Ethylene based unsaturated carboxylic acid or the anhydride thereof used for the production of the binder being acid modified is not particularly limited, however ethylene based unsaturated carboxylic acid having the carbon atoms of 4 to 10 or the anhydride thereof, particularly the maleic acid anhydride is preferable.

As ethylene based unsaturated carboxylic acid, ethylene based unsaturated monocarboxylic acid such as acrylic acid, methacrylic acid or so; ethylene based unsaturated dicarboxylic acid such as maleic acid, fumaric acid, itaconic acid, citraconic acid or so;

ethylene based unsaturated dicarboxylic acid anhydrides such as maleic acid anhydride, itaconic acid anhydride, citraconic acid anhydride or so;

unsaturated dicarboxylic acid monoalkyl esters such as; monomethyl maleate, monoethyl maleate, monopropyl maleate, mono-n-butyl maleate, monoisobutyl maleate, mono-n-pentyl maleate, mono-n-hexyl maleate, mono-2-ethylhexyl maleate, monomethyl fumarate, monoethyl fumarate, monopropyl fumarate, mono-n-butyl fumarate, monoisobutyl fumarate, mono-n-pentyl fumarate, mono-n-hexyl fumarate, mon-2-ethylhexyl fumarate, monomethyl itaconate, monoethyl itaconate, monopropyl itaconate, mono-n-butyl itaconate, monoisobutyl itaconate, mono-n-pentyl itaconate, mono-n-hexyl itaconate, mono-2-ethylhexyl itaconate, monomethyl citraconate, monoethyl citraconate, monopropyl citraconate, mono-n-butyl citraconate, monoisobutyl citraconate, mono-n-pentyl citraconate, mono-n-hexyl citraconate, mono-2-ethylhexyl citraconate, monomethyl mesaconate, monoethyl mesaconate, monopropyl mesaconate, mono-n-butyl mesaconate, monoisobutyl mesaconate, mono-n-pentyl mesaconate, mono-n-hexyl mesaconate, mono-2-ethylhexyl mesaconate, monomethyl glutaconate, monoethyl glutaconate, monopropyl glutaconate, mono-n-butyl glutaconate, monoisobutyl glutaconate, monoisobutyl glutaconate, mono-n-pentyl glutaconate, mono-n-hexyl glutaconate, mono-2-ethylhexyl glutaconate, monomethyl allylmalonate, monoethyl allylmalonate, monopropyl allylmalonate, mono-n-butyl allylmalonate, monoisobutyl allylmalonate, mono-n-pentyl allylmalonate, mono-n-hexyl allylmalonate, mono-2-ethylhexyl allylmalonate, monomethyl teraconate, monoethyl teraconate, monopropyl teraconate, mono-n-butyl teraconate, monoisobutyl teraconate, mono-n-pentyl teraconate, mono-n-hexyl teraconate, mono-2-ethylhexyl teraconate or so may be mentioned.

The binder being acid modified can be obtained by for example carrying out the ene type addition reaction of the hydrogenated polymer and ethylene based unsaturated carboxylic acid or anhydride thereof.

The ene type addition reaction usually occurs by kneading the hydrogenated polymer and ethylene based unsaturated carboxylic acid or anhydride thereof under high temperature without using the radical generator. When the radical generator is used, in addition to the generation of the gelation, the radical type addition reaction occurs between the hydrogenated polymer and ethylene based unsaturated carboxylic acid or anhydride thereof, thus ene type addition reaction cannot take place.

The used amount of the ethylene based unsaturated carboxylic acid or anhydride thereof is not particularly limited; but usually the ethylene based unsaturated carboxylic acid or anhydride thereof is 0.05 to 10 parts by weight, preferably 0.2 to 6 parts by weight with respect to 100 parts by weight of hydrogenated polymer.

During the ene type addition reaction, sufficient addition reaction may not be able to be carried out for example if an open type kneader such as a roll kneader or so is used, since ethylene based unsaturated carboxylic acid or anhydride thereof such as dissolved malic acid anhydride or so may scattered. If the continuous kneader such as a single axis extruder, a same direction twin axis extruder, a different direction rotation twin axis extruder is used, the addition reaction may not be carried out efficiently as the binder pilling up at the exit of the extruder forming a gel and causes the die head to clog. Also, a large amount of unreacted ethylene based unsaturated carboxylic acid or anhydride thereof may remain in the binder.

In the ene type addition reaction, a heat sealed kneader is preferably used. As for the heat sealed kneader, it can be selected from any of a batch type heat sealed kneader such as a pressure kneader, Bunbury mixer, Brabender or so; and among these, the pressure kneader is preferable.

In the above mentioned production method, before ethylene based unsaturated carboxylic acid or anhydride thereof is added to the hydrogenated polymer by the ene type addition reaction, ethylene based unsaturated carboxylic acid or anhydride thereof is prekneaded at the temperature of which the ene type addition reaction does not substantially take place, specifically at 60 to 170° C. and preferably at 100 to 150° C.; thereby ethylene based unsaturated carboxylic acid or anhydride thereof is uniformly dispersed in the hydrogenated polymer. If the temperature of this prekneading is too low, the hydrogenated polymer slips in the kneader, thus the hydrogenated polymer and ethylene based unsaturated carboxylic acid or anhydride thereof may not be mixed sufficiently. Also, if the prekneading temperature is too high, a large amount of ethylene based unsaturated carboxylic acid or anhydride thereof may scatter, hence the ene type addition reaction efficiency may decline.

Next, in order to carry out the ene type addition reaction, usually the mixture of the hydrogenated polymer and ethylene based unsaturated carboxylic acid or anhydride thereof during the kneading is maintained at 200 to 280° C., and preferably 220 to 260° C. As the method for maintaining said temperature, it is not particularly limited; however it is achieved usually by the method of applying the warm water or the steam to the jacket of the kneader, or by using the shear heat.

In case the warm water or the steam is applied to the jacket of the heat seal kneader, the temperature of the jacket is usually maintained at 70 to 250° C., and preferably 130 to 200° C. Also, in case the shear heat is used, it is preferable to continue the kneading at the shear speed of 30 to 1000 $s^{-1}$, preferably 300 to 700 $s^{-1}$ using the kneader. Particularly, in case of using the shear heat, the regulation of the temperature of the above mentioned mixtures can be carried out easily, hence it is preferable. The kneading time in the heat seal kneader is not particularly limited, however usually it is 120 seconds to 120 minutes, and preferably 180 seconds to 60 minutes.

In case the temperature of the above mentioned mixtures during the kneading is too low, the ene type addition reaction may not sufficiently proceed. Also, in case it is too high, the gelation or the burnt object may occur, as a result, the gel may be mixed into the product. Also, if the shear speed is too large, it is difficult to regulate the temperature of the above mentioned mixture using the shear heat, thus the temperature of the mixture becomes too high. Thereby, the gelation or the burnt object occurs thus it is not preferable as the industrial production method. Also, if the shear speed is too small, the temperature of the above mentioned mixture becomes too low; hence sufficient ene type addition reaction cannot be expected.

In the ene type addition reaction, by adding the antioxidant agent when kneading, the increase of the gelation of the binder can be prevented. The type of the antioxidant agent is not particularly limited, and an amine based, an amine ketone based, a phenol based, a benzoimidazol based and other antioxidant agent for the binder can be used.

As for the example of amine based antioxidants, phenyl-1-naphtylamine, alkylated diphenylamine, octylated diphenylamine, 4,4-bis(α,α-dimethylbenzyl)diphenylamine, p-(p-toluenesulfonylamide)diphenylamine, N,N-di-2-naphtyl-p-phenylenediamine, N,N-diphenyl-p-phenylenediamine, N-phenyl-N-isopropyl-p-phenylenediamine, N-phenyl-N-(1,3-dimethylbutyl)-p-phenylenediamine, N-phenyl-N-(3-methacryloyloxy-2-hydroxypropyl)p-phenylenediamine or so may be mentioned.

As the example of amineketone based antioxidant agent, 2,2,4-trimethyl-1,2-dihydroxyquinoline, 6-ethoxy-1,2-dihydro-2,2,4-trimethylquinoline or so may be mentioned.

As the example of the phenol based antioxidant agent, 2,6-di-tert-butyl-4-methylphenol, 2,6-di-tert-butyl-4-ethylphenol, 2,2-methylenebis(4-ethyl-6-tert-butylphenol), 2,2-methylenebis(4-methyl-6-tert-butylphenol), 4,4-butylidenebis(3-methyl-6-tert-butylphenol), 4,4-thiobis(3-methyl-6-tert-butylphenol), 2,5-di-tert-butylhydroquinone, 2,5-di-tert-amylhydroquinone or so may be mentioned.

As for the benzoimidazol based antioxidant, metal salts of 2-mercaptobenzoimidazol, 2-mercaptomethylbenzoimidazol, 2-mercaptobenzoimidazol or so may be mentioned.

The used amount of these antioxidant agents are usually 0.01 to 5 parts by weight, preferably 0.1 to 2 parts by weight with respect to 100 parts by weight of the binder.

According to the above mentioned production method, 80% or more of the charged amount of ethylene based unsaturated carboxylic acid or anhydride thereof which is used for the ene type addition reaction can be added to the hydrogenated polymer; thereby the binder used in the present invention can be obtained. Also, the charged amount of the unreacted ethylene based unsaturated carboxylic acid or anhydride thereof which remains in the binder can be made to 5% or less. Therefore, this method is extremely useful from industrial point of stable production. In the present invention, the binder including 0.05 to 20 wt % of the polymer unit having the hydrophilic group can be obtained by the above mentioned production method.

The binder used in the present invention is preferably obtained through the particulate metal removing step wherein the particulate metal included in the binder dispersion solution is removed during the production steps of the binder. By setting the content of the particulate metal included in the binder to 10 ppm or less, the metal ion crosslinking between the polymers in the slurry composition for the positive electrode over a period of time is prevented, and the increase of the viscosity can be prevented. Further, there is only a little risk of the internal short circuit or the dissolving depositing during the charging caused by the increase of the self-discharge, thus the cycle characteristic or the safety of the battery improves.

The method of removing the particulate metal component from the binder dispersion solution of said particulate metal removal step is not particularly limited, and for example the method of removing by filtration using the filter, the method of removing by vibrating strainer, the method of removing by the centrifuge, the method of removing by magnetic force or so can be mentioned. Among these, since the object of being removed is a metal component, the method of removal by the magnetic force is preferable. As for the method of removing by the magnetic force, it is not particularly limited as long as it is a method capable of removing the metal component, however considering the productivity and the removal efficiency; preferably it is carried out by placing the magnetic filter in the production line of the binder.

In the production step of the binder used in the present invention, the dispersing agent used in the above mentioned polymerization may be those used in the usual preparation. As specific examples, benzenesulfonate salts such as sodium dodecylbenzenesulfonate, sodium dodecylphenylethersulfonate or so; alkyl sulfate salts such as sodium lauryl sulfate, sodium tetradodecyl sulfate or so; sulfosuccinate salts such as sodium dioctylsulfosuccinate, sodium dihexylsulfosuccinate or so; fatty acid salts such as sodium laurate or so; ethoxy sulfate salts such as sodium polyoxyethylenelaurylethersulfate salt, sodium polyoxyethylenenonylphenylethersulfate salt or so; alkane sulfonate salt; sodium alkyl etherphosphoric acid ester salts; non-ionic emulsifier such as polyoxyethylenenonylphenylether, polyoxyethylenesorbitanelaurylester, copolymer of polyoxyethylene-polyoxypropylene block or so; gelatin, copolymer of maleic acid anhydride-styrene, polyvinylpyrrolidone, sodium polyacrylate, aqueous polymer such as polyvinyl alcohol having the polymerization degree of 700 or more and saponification degree of 75% or more, may be mentioned. These may be used alone or by combining two or more thereof. Among these, preferably it is benzenesulfonate salts such as sodium dodecylbenzenesulfonate, sodium dodecyphenylethersulfonate or so; alkyl sulfate salts such as sodium lauryl sulfate, sodium tetradodecyl sulfate or so; and further preferably it is benzenesulfonate salts such as sodium dodecylbenzenesulfonate, sodium dodecyphenylethersulfonate or so since it has excellent oxidation resistance. The added amount of the dispersing agent can be determined accordingly, and usually it is 0.01 to 10 parts by weight with respect to 100 parts by weight of the entire amount of the monomer.

pH of the binder used in the present invention when dispersed in the dispersion medium is preferably 5 to 13, and further preferably 5 to 12, and most preferably 10 to 12. By having pH of the binder within said range, the storage stability of the binder improves and further the mechanical stability improves as well.

As the pH regulator which regulates pH of said binder, hydroxides such as alkaline metal hydroxides such as lithium hydroxide, sodium hydroxide, potassium hydroxide; alkaline earth metal hydroxides such as calcium hydroxide, magnesium hydroxide, barium hydroxide, hydroxides of metal belonging to IIIA group in the long period table such as aluminum hydroxides or so; carbonates such as alkaline metal carbonates such as sodium carbonate, potassium carbonate, alkaline earth metal carbonate such as magnesium carbonate or so may be mentioned as examples; and as for the organic amine, alkyl amines such as ethyl amine, diethyl amine, propyl amine or so; alcohol amines such as monomethanol amine, monoethanolamine, monopropanol amine or so; ammoniums such as aqueous ammonia or so may be mentioned. Among these, alkaline metal hydroxides are preferable from the point of the binding property and the handling property, and particularly sodium hydroxide, potassium hydroxide, lithium hydroxide are preferable.

Also, in said binder, further other binding agent component may be included besides said polymer unit having the nitrile group, (meth)acrylate polymer unit, the polymer unit having the hydrophilic group, and the linear alkylene polymer unit. As other binding agent component, polyethylene, polytetrafluoroethylene (PTFE), polyvinylidene fluoride (PVDF), tetrafluoroethylene-hexafluoropropylene copolymer (FEP), poly acrylic acid, polyacrylonitrile, polyacrylate, polymethacrylate or so may be mentioned. Also, the copolymer including 50% or more of said resin component can be used as well, for example polyacrylic acid derivative such as acrylic acid-styrene copolymer, acrylic acid-acrylate copolymer or so; polyacrylonitrile derivative such as acrylonitrile-styrene copolymer, acrylonitrile-acrylate copolymer or so may be used. Among these, PVDF or polyacrylonitrile derivative are preferably used since it shows excellent positive electrode strength and the electrolytic solution resistance.

Further, the soft polymer shown in below, can be used as other binding agent as well.

Homopolymer of acrylic acid or methacrylic acid derivative or copolymer of the same with its copolymerizable monomer, such as polybutyl acrylate, polybutyl methacrylate, polyhydroxyethyl methacrylate, polyacrylamide, polyacrylic nitrile, butyl acrylate styrene copolymer, butyl acrylate acrylic nitrile copolymer and butyl acrylate-acrylic nitrile glycidyl methacrylate copolymer;

silicon containing soft polymers such as dimethyl polysiloxane, diphenyl polysiloxane and dihydroxy polysiloxane;

olefin based soft polymers such as liquid polyethylene, polypropylene, poly-1-butene, ethylene-α-olefin copolymer, propylene-α-olefin copolymer, ethylene-propylene-diene copolymer (EPDM) and ethylene-propylene-styrene copolymer;

vinyl based soft polymers such as polyvinyl alcohol, polyvinyl acetate, poly vinyl stearate and vinyl acetate styrene copolymer;

epoxy based soft polymers such as polyethylene oxide, polypropylene oxide and epichlorohydrin rubber;

fluorine containing soft polymers such as vinylidene fluoride based rubber and ethylene tetrafluoride-propylene rubber;

other soft polymers such as natural rubber, polypeptide, protein, polyester based thermoplastic elastomer, vinyl chloride based thermoplastic elastomer and polyamide based thermoplastic elastomer or so may be mentioned.

These soft polymers may have a crosslinked structure, or it may be introduced with the functional group by modification. These may be used alone, or by combining two or more thereof. Among these, polyacrylonitrile derivative is preferable for improving the dispersibility of the positive electrode active material.

(The Additives)

The binder composition for the secondary battery positive electrode of the present invention comprises the above mentioned binder, and further it may be added with additives in order to improve the charge-discharge characteristic of the secondary battery or the coating property of the slurry composition for the positive electrode which will be described in the following. As for these additives, cellulose based polymer such as carboxymethyl cellulose, methyl cellulose, hydroxypropyl cellulose or so; polyacrylic acid salts such as sodium polyacrylate or so, polyvinyl alcohol, polyethylene oxide, polyvinyl pyrrolidone, acrylic acid-vinyl alcohol copolymer, methacrylic acid-vinyl alcohol copolymer, maleic acid-vinyl alcohol copolymer, modified polyvinyl alcohol, polyethylene glycol, ethylene-vinyl alcohol copolymer, partially saponified product of polyvinyl acetate or so may be mentioned. The used ratio of these additives is preferably less than 300 wt %, more preferably 30 wt % or more and 250 wt % or less, and particularly preferably 40 wt % or more and 200 wt % or less with respect to the total weight of the solid portion of the binder composition. As long as it is within this range, the secondary battery positive electrode having excellent smoothness can be obtained. Also, as the additives, isothiazoline based compound or chelate compound or so can be included as well. These additives can be added to the slurry composition for the secondary battery positive electrode of the present invention besides the method of adding to the binder composition.

(The Production Method of the Binder Composition for the Secondary Battery Positive Electrode)

The production method of the binder composition for the secondary battery positive electrode of the present invention is not particularly limited, and the additives are added depending on the needs to the above mentioned binder dispersion solution, then mixed. The method of mixing the additive to the binder dispersion solution is not particularly limited, and for example the method using the mixing device such as the stirring type, the shaking type, and the rotating type or so may be mentioned. Also, the method using the dispersing kneader such as homogenizer, ball mill, sand mill, roll mill, a planetary kneader such as planetary mixer or so may be mentioned.

The Slurry Composition for the Secondary Battery Positive Electrode

The slurry composition for the secondary battery positive electrode of the present invention (hereinafter, it may be referred as "the slurry composition for the positive electrode") comprises the above mentioned binder composition for the secondary battery positive electrode and the positive electrode active material. Hereinafter, the slurry composition for the secondary battery positive electrode will be explained as the embodiment using as the slurry composition for the lithium ion secondary battery positive electrode.

(The Positive Electrode Active Material)

As for the positive electrode active material, the active material capable of absorbing and releasing the lithium ion is used, and the electrode active material for a positive electrode (positive electrode active material) for a lithium-ion secondary battery can be roughly divided into a group of inorganic compound and a group of organic compound.

The positive electrode active material in the group of inorganic compound may include transition metal oxides, transition metal sulfides, lithium containing complex metal oxides between lithium and the transition metal etc. As the above transition metal, Ti, V, Cr, Mn, Fe, Co, Ni, Cu, Mo or so can be used.

As for the transition metal oxide, MnO, $MnO_2$, $V_2O_5$, $V_6O_{13}$, $TiO_2$, $Cu_2V_2O_3$, amorphous $V_2O$—$P_2O_5$, $MoO_3$, $V_2O_5$, $V_6O_{13}$ or so may be mentioned. Among these, MnO, $V_2O_5$, $V_6O_{13}$, $TiO_2$ are preferable from the point of the cycle stability and the capacity of the obtained secondary battery.

As the transition metal sulfides, $TiS_2$, $TiS_3$, amorphous $MoS_2$, FeS or so may be mentioned.

As the lithium containing complex metal oxides, the lithium containing metal oxide having a layered structure, the lithium containing complex metal oxides having spinel structure, and the lithium containing complex metal oxide having olivine structure or so may be mentioned.

As for the lithium containing complex metal oxide having the layered structure, lithium containing cobalt oxide ($LiCoO_2$), lithium containing nickel oxide ($LiNiO_2$), lithium complex oxide of Co—Ni—Mn, lithium complex oxide of Ni—Mn—Al, lithium complex oxide of Ni—Co—Al, $xLiMaO_2 \cdot (1-x)Li_2MbO_3$ (wherein, $0 < x < 1$, Ma is one or more transition metal having the average oxidation state of 3+, Mb is one or more transition metal having the average oxidation state of 4+) which is a solid solution of $LiMaO_2$ and $Li_2MbO_3$, or so may be mentioned. From the point of improving the cycle characteristic of the secondary battery, it is preferable to use $LiCoO_2$; and from the point of improving the energy density of the secondary battery, the solid solution of $LiMaO_2$ and $Li_2MbO_3$ is preferable. Also, as the solid solution of $LiMaO_2$ and $Li_2MbO_3$, particularly $xLiMaO_2 \cdot (1-x)Li_2MbO_3$ (wherein, $0 < x < 1$, Ma=Ni, Co, Fe, Ti or so, Mb=Mn, Zr, Ti or so) is preferable. Among these, $xLiMaO_2 \cdot (1-x)Li_2MnO_3$ (wherein, $0 < x < 1$, Ma=Ni, Co, Fe, Ti or so) is preferable.

As the lithium containing complex metal oxides having spinel structure, $Li_a[Mn_{2-x}Md_x]O_4$ (here, Md is one or more transition metal having the average oxidation state of 4+, Md=Ni, Co, Fe, Cu, Cr or so, $0 < x < 1$, $0 \le a \le 1$) of which a part of Mn of lithium manganite ($LiMn_2O_4$) is substituted by other transition metal or so may be mentioned. Among these, $Li_aFe_xMn_{2-x}O_{4-z}$ ($0 \le a \le 1$, $0 < x < 1$, $0 \le z \le 0.1$) wherein Mn is substituted by Fe is preferable since it is inexpensive; and $LiNi_{0.5}Mn_{1.5}O_4$ or so wherein Mn is substituted by Ni is preferable since all of $Mn^{3+}$ which is thought to be the cause of the structural deterioration can be substituted, and since it under goes the electric chemical reaction of $Ni^{4+}$ from $Ni^{2+}$, it can have high operation voltage and high capacity.

As the lithium containing complex metal oxide having olivine structure, the olivine type lithium phosphate compound expressed by $Li_yMcPO_4$ (here, Mc is one or more transition metal having the average oxidation state of 3+, and Mc=Mn, Co or so, $0 \le y \le 2$) or so may be mentioned. Mn or Co may be partially substituted by other metal, and as for the metal which can be substituted, Fe, Cu, Mg, Zn, V, Ca, Sr, Ba, Ti, Al, Si, B and Mo or so may be mentioned.

Also, the positive electrode active material having the poly anion structure such as $Li_2MeSiO_4$ (here, Me is Fe, Mn) or so; $LiFeF_3$ having the perovskite structure, and $Li_2Cu_2O_4$ having orthohombus structure or so may be mentioned.

As the organic compound, a conductive polymer such as polyacetylene and poly-p-phenylene can be used. An iron-based oxide which is poor in electric conductivity, may be subject to reduction firing in the presence of the carbon source substance and can be used as an electrode active material coated with carbon material. Also, these compounds may partially be element substituted. The positive electrode active material may be a mixture of the above mentioned inorganic compound and the organic compound.

The particle diameter of the positive electrode active material used in the present invention may be properly selected depending on the other battery requirements, and 50% volume cumulative diameter is normally 0.1 to 50 μm, preferably 0.4 to 30 μm, and further preferably 1 to 20 μm, in view of improvement in battery characteristics such as load characteristic and cycle characteristic. When the 50% volume cumulative diameter is within the range, a secondary battery having excellent output characteristic and large charge-discharge capacity can be obtained, and also it is easy to handle when producing the slurry for electrode and an electrode. 50% volume cumulative diameter can be obtained by measuring particle diameter distribution by laser diffraction.

BET specific surface area of the positive electrode active material is preferably 0.1 to 10 $m^2/g$, and more preferably 0.2 to 1.0 $m^2/g$. By having the BET specific surface area of the positive electrode active material within the above range, the slurry composition for the positive electrode which is stable, and Li can be easily inserted and released to the active material structure. Note that, in the present invention, "BET specific surface area" refers to the BET specific surface area by the nitrogen absorption method, and it is a value measured in accordance with ASTM D3037-81.

Also, the positive electrode active material has the charge average voltage against the lithium metal of less than 3.9 V, from the point that the structural stability during the long term cycle of the positive electrode active material itself; and the acid stability of the electrolytic solution are high. Note that, in the present invention, the charge average voltage refers to the electrical potential wherein the secondary battery is charged till the upper limit of the voltage using the constant current method and when lithium is being released (plateau). The upper limit of the voltage has a risk that the battery may expand when it exceed said voltage, and it may start to generate the heat, hence it refers to the voltage which is the limit where the safety can be ensured.

The total content (the solid portion equivalent amount) of the binder composition and the positive electrode active material in the slurry for the secondary battery positive electrode of the present invention is preferably 10 to 90 parts by weight, and more preferably 30 to 80 parts by weight with respect to 100 parts by weight (the solid portion equivalent amount) of the slurry composition for the positive electrode. The content (the solid portion equivalent amount) of the binder composition with respect to the total amount of the positive electrode active material is preferably 0.1 to 5 parts by weight, and more preferably 0.5 to 2 parts by weight with respect to 100 parts by weight of the total amount of the positive electrode active material. When the total content of the positive electrode active material and the binder composition in the slurry composition for the positive electrode, and the content of the binder composition are within the above mentioned range, the viscosity of the obtained slurry composition for the positive electrode is adjusted, thus the coating can be carried out smoothly. Further, the resistance regarding the obtained positive electrode does not increase while a sufficient adhering strength can be obtained. As a result, the release of the binder composition from the positive electrode active material during the electrode plate pressing step can be suppressed.

As for the dispersion medium of the slurry composition for the positive electrode, it is not particularly limited, as long as the binder composition can be uniformly dissolved or dispersed; and either of water or the organic solvent can be used. The organic solvent may include cyclic aliphatic hydrocarbons such as cyclopentane and cyclohexane or so; aromatic hydrocarbons such as toluene, xylene and cyclobenzene or so; ketones such as acetone, ethylmethyl ketone, diisopropyl ketone, cyclohexanone, methylcyclohexane, ethylcyclohexane or so; chlorine based aliphatic hydrocarbons such as methylene chloride, chloroform, and carbon tetrachloride or so; esters such as ethyl acetate, butyl acetate, γ-butyrolactone; ε-caprolactone or so; acylonitriles such as acetonitrile, propionitrile or so; ethers such as tetrahydrofurane, ethyleneglycoldiethylether or so; alcohols such as methanol, ethanol, isopropanol, ethyleneglycol, ethyleneglycolmonomethylether or so; amides such as N-methylpyrrolidone, and N,N-dimethylformamide or so may be mentioned.

These dispersion mediums may be used alone or by combining two or more thereof. Among these, the medium with excellent dispersibility of the positive electrode active material or the conductive agent which will be described in the following, and having low boiling point and high volatility are preferable since it can be removed in short period of time under low temperature. Acetone, toluene, cyclohexanone, cyclopentane, tetrahydrofurane, cyclohexane, xylene, water, N-methylpyrrolidone or so, and also the mixed medium thereof are preferable.

The solid portion concentration of the slurry composition for the positive electrode is not particularly limited as long as it is capable of coating and immersing, and also has viscosity having fluidity; however in general it is 10 to 80 wt % or so.

(The Conductive Agent)

The slurry composition for the positive electrode preferably comprises the conductive agent. As the conductive agent, conductive carbons such as acetylene black, Ketjen black, carbon black, graphite, vapor-grown carbon fiber and carbon nanotube or so can be used. By comprising the conductive agent, the electrical connection of the positive electrode active materials against each other can be improved, and the discharge rate characteristic when using the secondary battery can be improved. The content of the conductive agent in the slurry composition for the positive electrode is preferably 1 to 20 parts by weight and more preferably 1 to 10 parts by weight with respect to 100 parts by weight of the total amount of the positive electrode active material.

(The Viscosity Thickener)

The slurry composition for the positive electrode preferably comprises the viscosity thickener. As the viscosity thickener, the cellulose based polymer such as carboxymethyl cellulose, methyl cellulose, hydroxylpropyl cellulose or so and the ammonium salts and alkaline metal slats thereof; (modified) poly(meth)acrylic acid and the ammonium salts and the alkaline metal salts thereof; the polyvinyl alcohols such as (modified) poly vinyl alcohol, the copolymer of acrylic acid or the acrylic acid salts with the vinyl alcohol, the copolymer of the maleic acid unhydride or the fumaric acid with the vinyl alcohol; polyethylene glycol, polyethylene oxide, poly vinyl pyrrolidone, modified poly acrylic acid, oxidized starch, phosphoric acid starch, casein, various modified starch or so may be mentioned.

The blending amount of the viscosity thickener is preferably 0.5 to 1.5 parts by weight with respect to 100 parts by weight of the positive electrode active material. When the blending amount of the viscosity thickener is within above mentioned range, the coating property and the adhesiveness with the current collector are excellent. In the present invention, "(modified) poly" refers to "unmodified poly" or "modified poly", and "(meth)acrylic" refers to "acrylic" or "methacrylic".

(Other Components)

The slurry composition for the positive electrode may include, besides the above mentioned components, other components such as reinforcing material, leveling agent, the electrolytic solution additives which has function to suppress the electrolytic solution decomposition or so; and also these may be included in the secondary battery positive electrode which will be described in the following. These may not be particularly limited, as long as it does not influence the battery reaction.

As a reinforcing material, a variety of inorganic and organic fillers having spherical shape, sheet shape, rod shape or fibrous form can be used. By using the reinforcing material, the positive electrode which is strong and flexible can be obtained, and an excellent long term cycle characteristic can be exhibited. The content of the reinforcing material in the slurry composition for the positive electrode is usually 0.01 to 20 parts by weight, and preferably 1 to 10 parts by weight with respect to 100 parts by weight of the total amount of the positive electrode active material. By being within the above mentioned range, high capacity and high load characteristic can be exhibited.

As the leveling agent, the surfactants such as alkyl based surfactant, the silicone based surfactant, the fluorine based surfactant, and the metal based surfactant or so may be mentioned. By mixing the leveling agent, the repelling during the coating can be prevented, and the smoothness of the positive electrode can be improved. The content of the leveling agent in the slurry composition for the positive electrode is preferably 0.01 to 10 parts by weight with respect to 100 parts by weight of the total amount of the positive electrode active material. By having the content of the leveling agent within above mentioned range, the productivity of the positive electrode production, the smoothness, and the battery characteristic becomes excellent. By comprising the surfactant, the dispersibility of the positive electrode active material in the slurry composition for the positive electrode can be improved, further thereby the smoothness of the obtained positive electrode can be improved as well.

As the electrolytic solution additive, vinylene carbonate or so which is used in the slurry composition for the positive electrode and the electrolytic solution can be used. The content of the electrolytic solution additive in the slurry composition for the positive electrode is preferably 0.01 to 10 parts by weight with respect to 100 parts by weight of the total amount of the positive electrode active material. When the electrolytic solution additive is within the above mentioned range, the high temperature cycle characteristic and the high temperature characteristic become excellent. Besides the above mentioned, nano particles such as fumed silica or fume alumina or so may be mentioned. By mixing such nano particles, thixotropy of the slurry composition for the positive electrode can be controlled, and thereby the obtained positive electrode can enhance the leveling property. The content of the nano particles in the slurry composition for the positive electrode is preferably 0.01 to 10 parts by weight with respect to 100 parts by weight of the total amount of the positive electrode active material. When the nano particles are within the above mentioned range, the slurry stability and the productivity are excellent and the high battery characteristic is exhibited.

(The Production of the Slurry Composition for the Secondary Battery Positive Electrode)

The slurry composition for the secondary battery positive electrode is obtained by mixing the above mentioned binder composition, the positive electrode active material, and the conductive agent used if needed. The amount of the dispersion medium used when preparing the slurry composition for the positive electrode is the amount so that the solid portion concentration of the slurry composition for the positive electrode is within the range of usually 1 to 80 wt %, and preferably 5 to 50 wt %. When the solid portion concentration is within such range, the above mentioned binder composition can be dispersed uniformly thus it is preferable.

The method of mixing is not particularly limited, and for example, the method using the mixing apparatus such as the stirring type, the vibrating type, and the rotating type or so may be mentioned. Also, the method of using the dispersion kneading apparatus such as the homogenizer, the ball mill, the sand mill, the roll mill, and the planetary mixer or so may be mentioned as well.

The viscosity of the slurry composition for the positive electrode is usually 10 to 50,000 mPa·s, preferably 100 to 10,000 mPa·s, and more preferably 300 to 2000 mPa·s when the production method of the positive electrode as described in the following is carried out by the wet molding method of (II). When the production of method of following described is carried out by the dry molding method (III), then it is usually 10 to 3,000 mPa·s, preferably 30 to 1,500 mPa·s, and more preferably 50 to 1,000 mPa·s. When the viscosity of the slurry composition for the positive electrode is within this range, for the wet molding method, a uniform electrode can be obtained, and the cycle characteristic of the obtained battery is improved. Also, for the dry molding method, the productivity of the following described composite particle can be increased. Also, the higher the viscosity of the slurry composition for the positive electrode is, the larger the droplet of the spray becomes; hence the weight average particle diameter of the obtained composite particle becomes larger as well. Said viscosity is a value measured when the rotational speed is 60 rpm at 25° C. using B type viscometer.

The Secondary Battery Positive Electrode

The secondary battery positive electrode of the present invention (it may be referred as "the positive electrode") is formed by forming the positive electrode active material layer made of the slurry composition for the secondary battery positive electrode of the present invention on the current collector.

(The Production Method of the Secondary Battery Positive Electrode)

The production method of the secondary battery positive electrode of the present invention is not particularly limited. Specifically, (I) the method of sheet molding the slurry composition for the positive electrode, and stacking the obtained sheet on the current collector then forming the positive electrode active material layer (the sheet molding method); (II) the method of coating and drying the above mentioned slurry composition for the positive electrode to at least to one side, preferably to both sides, of the current collector, then forming the positive electrode active material layer (the wet molding method); and (III) the method of preparing the composite particle from the above mentioned slurry composition for the positive electrode, then supplying this on the current collector for sheet molding, then forming the positive electrode active material layer (the dry molding method) or so may be mentioned. Among these, (II) the wet molding method or (III) the dry molding method are preferable. (II) the wet molding method is excellent that it exhibits excellent productivity of the secondary battery positive electrode, and (III) the dry molding method is excellent that it allows the capacity of the obtained secondary battery positive electrode to increase, and lowers the internal resistance.

In (II) the wet molding method, the method of coating the slurry composition for the positive electrode on to the current collector is not particularly limited. For example, doctor blade method, dip method, reverse roll method, direct roll method, gravure method, extrusion method, brush method or so may be mentioned.

For the drying method, for example, the drying by warm air, hot air or low wet air, vacuum drying, drying method with irradiation of (far-) infrared rays, electron beam and the like may be mentioned. The drying time is usually 5 to 30 minutes, and the drying temperature is 40 to 180° C.

The composite particle of (III) the dry molding method refers to the particle wherein the binder composition or the positive electrode active materials or so included in the slurry composition for the positive electrode is forming one body. By forming the positive electrode active material layer by the composite particle, the binding property of the obtained secondary battery positive electrode can be made higher, and also the internal resistance can be reduced.

The composite particle suitably used in the present invention is produced by forming a particle from the binder composition, the positive electrode active material and the conductive agent or so which is added if needed.

It may be produced by known granulation methods such as the spray drying granulation method, the tumbling layer granulation method, the compression type granulation method, the stirring type granulation method, the extrusion granulation method, the pulverized type granulation method, the fluid layer granulation method, the fluid layer multifunctional type granulation method, the pulse combustion type drying method, and the melt granulation method or so may be mentioned. Among these, the spray drying granulation method is preferable, since the composite particle wherein the binder composition and the conductive agent are distributed near the surface area can be obtained easily. When the composite particle obtained by the spray drying granulation method is used, the secondary battery positive electrode of the present invention can be obtained with high productivity. Also, internal resistance of the secondary battery positive electrode can be further reduced.

In the spray drying granulation method, the slurry composition for the secondary battery positive electrode of the present invention is granulated by the spray drying; thereby the composite particle is obtained. The spray drying is carried out by spraying and drying the slurry composition for the positive electrode in the hot air. As for the apparatus used for spraying the slurry composition for the positive electrode, an atomizer may be mentioned. The atomizer has two types of the apparatus which are the rotating disk system and the compression system. The rotating disk system is the system which the slurry is introduced into approximately the center of the disk rotating in a high speed, and the slurry is sprayed when the slurry is released out of the disk due to the centrifugal force of the disk. The rotation speed of the disk depends on the size of the disk, however usually it is 5,000 to 40,000 rpm and preferably 15,000 to 40,000 rpm. The lower the speed of the disk is, the larger the drops of the spray become, and hence the weight average volume particle diameter of the composite particle becomes large. As for the atomizer of the rotating disk system, a pin type and a vane type may be mentioned; however the pin type is preferable. The pin type atomizer is one type of the centrifugal spraying apparatus using the spraying disk, wherein said spraying disk constituted by a plurality of spraying rollers which is mounted between a top-bottom mounting disks in removable manner on approximately concentric circle along the peripheral of the top-bottom mounting disk. The slurry composition for the positive electrode is introduced from the center of the spraying disk, and adhered to the spraying rollers by centrifugal force, then moves towards the outside on the surface of the rollers, and finally the slurry composition for the positive electrode is released from the surface of the rollers to be sprayed. On the other hand, the compression system is a system in which the slurry composition for the positive electrode is compressed and dried by atomizing from the nozzle.

The temperature of sprayed slurry which is sprayed is normally at the room temperature; however it may be higher than the room temperature by heating. Also, the hot air temperature during the spray drying is usually 80 to 250° C., and preferably 100 to 200° C.

In the spray drying method, the introduction of the hot air is not particularly limited, and for example, a system in which the hot air and the spray direction is parallel in the transverse direction; a system in which it is sprayed at the top of the drying tower and runs down together with the hot air; a system in which the sprayed drops and the hot air contacts by counter flowing; and a system in which the sprayed drops initially flows in parallel with the hot air then falls down due to the gravity and contacts by counter flowing or so may be mentioned.

The shape of the composite particle suitably used in the present invention is preferably substantially spherical. That is, when the short axis diameter of the composite particle is $L_s$, and the long axis diameter is $L_1$, $L_a=(L_s+L_1)/2$, and when the spherical degree (%) is the value of $(1-(L_1-L_s)/L_a)\times100$, then the spherical degree is preferably 80% or higher, and more preferably 90% or higher. Here, the short axis diameter $L_s$ and the long axis diameter $L_1$ are the value measured by the transmission electron microscope image.

The volume average particle diameter of the composite particle suitably used in the present invention is usually 5 to 500 μm, preferably 7 to 300 μm, and more preferably 10 to 100 μm. The volume average particle diameter can be measured by the laser diffraction particle size analyzer.

In the present invention, the feeder used in the step for supplying the composite particle on the current collector is not particularly limited; however the quantitative feeder capable of supplying the composite particle quantitatively is preferably used. Here, being capable of supplying quantitatively means that the composite particle is sequentially supplied using said feeder, and the supplied amount is measured several times at certain interval, then CV value (=σm/m×100) obtained from the mean value m and the standard deviation σm of the measured value is 4 or less. The quantitative feeder suitably used in the present invention preferably has 2 or less CV value. As the specific quantitative feeder, gravity feeders such as a table feeder, a rotary feeder or so; mechanical feeders such as screw feeder, a belt feeder or so may be mentioned. Among these, rotary feeder is suitable.

Next, the current collector and the composite particle supplied are applied with a pressure by a pair of rolls, and the positive electrode active material layer is formed on the current collector. In this step, said composite particle, being heated if needed, is molded to the sheet form positive electrode active material layer by a pair of roll. The temperature of the composite particle being supplied is preferably 40 to 160° C., and more preferably 70 to 140° C. When using the composite particle within this range of temperature, there is no slipping of the composite particle at the surface of the press roll, thus the composite particle is supplied to the press roll sequentially and evenly, hence the positive electrode active material layer having uniform thickness and with small unevenness of the electrode density can be obtained.

The temperature of molding is usually 0 to 200° C., and it is preferably higher than the melting point or the glass transition temperature of the binder used in the present invention, and more preferably it is higher by 20° C. or more than the melting point or the glass transition temperature. The molding speed in case of using the roll is usually 0.1 m/min or more, and preferably 35 to 70 m/min. Also, the press line pressure between the press roll is usually 0.2 to 30 kN/cm, and preferably 0.5 to 10 kN/cm.

In the above production method, the placement of said pair of roll is not particularly limited; however it is preferably placed approximately horizontal or approximately perpendicular. In case it is placed approximately horizontal, the current collector is sequentially supplied between a pair of the roll, and the composite particle is supplied to at least either one of the roll, thereby the composite particle is supplied to the space between the current collector and the roll, hence the positive electrode active material layer can be formed by applying the pressure. In case it is placed approximately perpendicular, the current collector is moved in a horizontal direction, and the composite particle is supplied on the current collector. Then, after making the supplied composite particle even by using the blade or so if needed, said current collector is supplied between said pair of roll, thereby the positive electrode active material layer is formed by applying the pressure.

When producing the secondary battery positive electrode of the present invention, it is preferable to have a step of lowering the porosity of the positive electrode active material layer by pressure applying treatment using the metal mold press or roll press or so, after the positive electrode active material layer comprising the slurry composition for the positive electrode is formed on the current collector. The preferable range of the porosity is 5 to 30%, and more preferably 7 to 20%. If the porosity is too high, the charging efficiency and the discharging efficiency deteriorate. In case the porosity is too low, the high volume capacity is difficult to obtain, and the positive electrode active material layer is easily released from the current collector which causes the problem of the malfunction to occur easily. Further, in case the curable polymer is used for the binder composition for the positive electrode, it is preferably cured.

The thickness of the positive electrode active material layer of the secondary battery positive electrode of the present invention is usually 5 to 300 μm, and preferably 10 to 250 μm. When the thickness of the positive electrode active material layer is within said range, the load characteristic and the cycle characteristic both exhibit high characteristics.

In the present invention, the content ratio of the positive electrode active material of the positive electrode active material layer is preferably 90 to 99.9 wt %, and more preferably 95 to 99 wt %. By having the content ratio of the positive electrode active material within said range, it can exhibit flexibility and the binding property while showing high capacity.

(The Current Collector)

The current collector is not particularly limited if this is a material having electric conductivity and electrochemical durability, and for example, metal materials such as iron, copper, aluminum, nickel, stainless steel, titanium, tantalum, gold and platinum are preferable in view of their heat resistance. Among these, aluminum is particularly preferable for current collector of a secondary battery positive electrode. The shape of the current collector is not particularly limited, and the sheet form current collector having a thickness of about 0.001 to 0.5 mm is preferable. It is preferable that the current collector is subject to a roughening treatment in advance before the use, in order to increase the adhering strength with the positive electrode active material layer. Method of the roughening treatment may include mechanical method of polishing, electropolishing, chemical polishing, etc. In the mechanical method of polishing, a coated abrasive in which abrasive particles are fixed, a grinding stone, an emery buff, a wire-brush provided with steel wire and the like or so can be used. Also, an intermediate layer may be formed on the surface of the current collector to increase the adhering strength and conductivity between the positive electrode active material layer and the current collector; and particularly it is preferable to form the conductive adhesive layer.

The Secondary Battery

The secondary battery of the present invention comprises the positive electrode, the negative electrode, the separator and the electrolytic solution, wherein the positive electrode is the above mentioned secondary battery positive electrode.

(The Negative Electrode)

The negative electrode is formed by stacking the negative electrode active material layer including the negative electrode active material and the binder composition for the secondary battery negative electrode on the current collector.

(The Negative Electrode Active Material)

The negative electrode active material used in the present invention is a material capable of giving and receiving the electrons in the secondary battery negative electrode. As for the lithium ion secondary battery negative electrode, specifically, carbon materials such as amorphous carbon, graphite, natural black lead, mesocarbon microbead (MCMB) and pitch-based carbon fiber, conductive polymer such as polyacene or so may be mentioned. Preferably it is a crystalline carbon material such as graphite, natural black lead, mesocarbon microbead (MCMB) or so. Also, as the negative electrode active material, a metal such as silicon, tin, zinc, manganese, iron and nickel, the alloy thereof, oxide and sulfate salt of the above metal or alloy can be used. In addition, metal lithium, lithium alloy such as Li—Al, Li—Bi—Cd and Li—Sn—Cd, nitride of lithium-transition metal, silicone or so can be used as well. The above mentioned negative electrode active material can be used alone or by combining two or more thereof.

The shape of the negative electrode active material is preferably granulated to a particle form. If the shape of the particle is spherical, the electrode having higher density can be formed when forming the electrode.

The volume average particle diameter of the negative electrode active material can properly selected depending on the other battery requirements, but usually it is 0.1 to 100 μm, preferably 1 to 50 μm, and more preferably 5 to 20 μm. Also, 50% volume cumulative diameter of the negative electrode active material is normally 1 to 50 μm, preferably 15 to 30 μm, in view of improvement in battery characteristics such as initial efficiency, load characteristic and cycle characteristic.

The tap density of the negative electrode active material is not particularly limited, but those having 0.6 g/cm$^3$ or more are suitably used.

The content ratio of the negative electrode active material of the negative electrode active material layer is preferably 85 to 99 wt %, more preferably 88 to 97 wt %. By having the content ratio of the negative electrode active material within the above mentioned range, it can exhibit flexibility and binding property while showing high capacity.

In the present invention, the density of the negative electrode active material layer of the secondary battery negative electrode is preferably 1.6 to 1.9 g/cm$^3$, more preferably 1.65 to 1.85 g/cm$^3$. By having the density of the negative electrode active material layer within said range, a battery with high capacity can be obtained.

(The Binder Composition for the Secondary Battery Negative Electrode)

As the binder composition for the secondary battery negative electrode, known material can be used without any particular limitation. For example, resins such as polyethylene, polytetrafluoroethylene (PTFE), polyvinylidene fluoride (PVDF), tetrafluoroethylene-hexafluoropropylene copolymer (FEP), polyacrylic acid derivative, polyacrylonitrile derivative or so; soft polymers such as acrylic based soft polymer, diene based soft polymer, olefin based soft polymer, vinyl based soft polymer or so can be used. These may be used alone or by combining two or more thereof.

The negative electrode may include, besides the above mentioned components, other components such as conductive agent, viscosity thickener, reinforcing material, leveling agent, and the electrolytic solution additives which have function to suppress the electrolytic solution decomposition or so. These may not be particularly limited, as long as it does not influence the battery reaction.

As the current collector, those used in the aforementioned secondary battery positive electrode can be used, and it is not particularly limited if this is a material having electric conductivity and electrochemical durability. However, as the secondary battery negative electrode, copper is particularly preferable.

The thickness of the negative electrode active material layer is usually 5 to 300 μm, and more preferably 10 to 250 μm. By having the thickness of the negative electrode active material within said range, the load characteristic and the energy density both exhibit high characteristic.

The negative electrode can be produced as same as the aforementioned positive electrode.

(The Separator)

The separator is a porous substrate, and as the separator capable to be used, (a) a porous separator having a porous part, (b) a porous separator formed with a polymer coat layer at one face or both faces, or (c) a porous separator formed with porous resin coat layer including the inorganic ceramic powder or so may be mentioned. As for the non-limiting example of these, polypropylene based, polyethylene based, polyolefin based, or aramid based porous separator; a separator coated with a gel like polymer coat layer or polymer film for solid polymer electrolyte or gel form polymer electrolyte such as polyvinylidene fluoride, polyethyleneoxide, polyacrylonitrile or polyvinylidene fluoride hexapropylene copolymer; or a separator coated with porous film layer made of inorganic filler and dispersing agent for inorganic filler or so may be mentioned.

(The Electrolytic Solution)

The electrolytic solution used in the present invention is not particularly limited, and for example those dissolving the lithium salt as the supporting electrolyte in the non-aqueous solvent can be used. As lithium salt, for example $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, $(C_2F_5SO_2)_2NLi$ and the like may be mentioned. Among these, $LiPF_6$, $LiClO_4$ and $CF_3SO_3Li$ are preferable, which are easily dissolved in the solvent and exhibit a high degree of dissociation. These may be used alone or by combining two or more thereof. The amount of the supporting electrolyte with respect to the electrolytic solution is usually 1 wt % or more, preferably 5 wt % or more; or usually 30 wt % or less, preferably 20 wt % or less. The charging characteristic and discharge characteristic of the battery declines and the ion conductivity degree declines if the amount of the supporting electrolyte is too little or too much.

As the solvent used for the electrolytic solution, it is not particularly limited as long as the supporting electrolytes can be dissolved. Usually, alkyl carbonates such as dimethyl carbonate (DMC), ethylene carbonate (EC), diethyl carbonate (DEC), propylene carbonate (PC), butylene carbonate (BC) and methyl ethyl carbonate (MEC); esters such as γ-butyrolactone and methyl formate; ethers such as 1,2-dimethoxy ethane and tetrahydrofuran; sulfur-containing compounds such as sulfolane and dimethyl sulfoxide or so may be used. Among these, dimethyl carbonate, ethylene carbonate, propylene carbonate, diethyl carbonate, and methylethyl carbonate are preferable, since particularly high ion conductivity can be easily obtained, and as the used temperature range is wide. These may be used alone or by combining two or more thereof.

Also, it is possible to add the additives to the electrolytic solution for use. As the additives, the compounds of carbonates such as vinylene carbonate (VC) are preferable.

As the electrolytic solution besides the above mentioned, gelatinous form polymer polymer electrolytes immersed in the polymer electrolyte such as polyethyleneoxide, polyacrylonitrile or so; or inorganic solid electrolytes such as lithium sulfide, LiI, $Li_3N$ or so may be mentioned.

(The Production Method of the Secondary Battery)

The production method of the present invention is not particularly limited. For example, the positive electrode and the negative electrode mentioned in above may be layered via the separator, which is then winded or bended depending on the battery shape to fit in the battery case, followed by filling the electrolyte in the battery case and sealing the case. Also, as needed, it is possible to prevent pressure increase inside the battery and overcharge-overdischarge by setting in expanded metal, overcurrent protection element such as fuse and PTC element, and lead plate, etc. The shape of the battery may include coin shape, button shape, sheet shape, cylinder shape, square shape and flattened shape.

EXAMPLES

Hereinbelow, the present invention will be explained using the examples; however the present invention is not to be limited thereto. Note that, parts and % in the present examples are based on weight unless mentioned otherwise. Various physical properties are evaluated as following in the examples and the comparative examples.

<The Glass Transition Temperature of the Binder>

The glass transition temperature (Tg) of the binder was measured based on JIS K 7121; 1987 using a differential scanning calorimeter (DSC6220SII made by Nanotechnology Corporation).

<The Solubility Parameter (SP Value) of the Binder>

The SP value (δ) is determined according to the below formula which is obtained from the characteristic value of the functional group (the atomic group) of each monomer constituting the polymer unit of the binder, that is from the sum of the molecular attraction constant (G) and the molecular weight.

$$(δ)=ΣG/V=dΣG/M$$

ΣG: the sum of the molecular attraction constant G
V: the specific volume
M: the molecular weight
d: the specific gravity <The Iodine Value of the Binder>

100 g of NMP solution of the binder was solidified in 1 liter of methanol, then vacuum dried over night at 60° C. The iodine value of the dried binder was measured in accordance with JIS K6235; 2006.

<The Swelling Degree of the Binder>

NMP solution of the binder was casted in polytetrafluoroethylene sheet, and the casted film was obtained by drying. This casted film was cut into 4 cm² and weighed (the weight A before immersing), then it was immersed in the electrolytic solution of 60° C. The immersed film was pulled out after 72 hours, and wiped by a towel paper and weighed (the weight B after immersing). The electrolytic solution swelling degree of the binder was calculated from the following formula, and evaluated in the below standard. The lower the swelling degree is, the more excellent the electrolytic solution resistance and the battery characteristic (the high temperature cycle characteristic) are. Note that, as for the electrolytic solution, the solution wherein $LiPF_6$ dissolved in a concentration of 1 mol/litter in the mixed solvent which is the mixture of ethylenecarbonate (EC) and diethylcarbonate (DEC) of EC:DEC=1:2 (the capacity ratio at 20° C.) was used.

The swelling degree (%)=$B/A\times100$(%)

<The Slurry Stability>

The viscosity of the slurry for the positive electrode was measured by the single cylinder rotational viscometer (25° C., rotational speed: 60 rpm, spindle shape: 4) in accordance with JIS Z8803:1991. Then the value after 1 minute was measured and this was set as the slurry viscosity A. Also, value after 1 day of the production of the slurry composition for the positive electrode was measured and this was set as the slurry viscosity B. The rate of change of the viscosity of the slurry composition for the positive electrode was calculated from the below formula, and evaluated in accordance with the following standard. The lower the rate of change of the viscosity is, the more excellent the slurry stability is.

The rate of change of the viscosity (%)=$(B-A)/A\times100$

A: less than 10%
B: 10% or more and less than 50%
C: 50% or more and less than 100%
D: 100% or more and less than 200%
E: 200% or more and less than 500%
F: 500% or more <The Electrode Flexibility>

The rods having a different diameter were placed on the positive electrode active material layer side of the positive electrode, and the positive electrode was wound to the rod, then evaluated whether the positive electrode active material layer would form a crack. The smaller the diameter of the rod is, the more excellent the winding property of the positive electrode is. When the winding property is excellent, the release of the positive electrode active material layer can be suppressed; thus an excellent cycle characteristic of the secondary battery can be obtained.

A: no crack at 1.2 mmφ
B: no crack at 1.5 mmφ
C: no crack at 2 mmφ
D: no crack at 3 mmφ
E: no crack at 4 mmφ

<The High Temperature Characteristic>

The full cell coin type battery of 5 cells were charged to 4.2V by the constant current method of 0.5 C at the atmosphere of 45° C., then it was discharged until it reached to 3.0V; and this charge and discharge was repeated for 200 times. The charge discharge electric capacity maintaining ratio (=the electric capacity after the $200^{th}$ cycle/the electric capacity after $5^{th}$ cycle×100) (%) was obtained; wherein it is expressed by the ratio of the electric capacity after the $200^{th}$ cycle and the electric capacity of after $5^{th}$ cycle. The larger this value is, the more excellent the high temperature characteristic is. Note that, in the example 13, the high temperature cycle characteristic in case of using 10 cells of half-cell coin type lithium ion secondary battery was evaluated as well.

Example 1

The Production of the Binder Composition for the Positive Electrode

To the autoclave with the stirrer, 240 parts of ion exchange water, 2.5 parts of alkylbenzene sodium sulfonate, 20 parts of acrylonitrile, 30 parts of 2-ethylhexylacrylate, and 5 parts of methacrylic acid were introduced in this order. Then, after substituting the inside of the bottle with the nitrogen, 45 parts of 1,3-butadiene were pressure introduced, and 0.25 parts of ammonium persulfate was added to carry out the polymerization reaction at the reaction temperature of 40° C. Thereby, the polymer including the polymer unit having nitrile group, (meth)acrylate polymer unit, the polymer unit having hydrophilic group and the polymer unit capable of forming conjugated diene monomer were obtained. The polymerization transformation rate was 85%, and the iodine value was 280 mg/100 mg.

400 ml (the entire solid portion 48 gram) of solution, which was prepared by diluting said polymer with water to have the entire solid portion concentration of 12 wt %, was introduced into 1 litter autoclave with the stirrer, and oxygen dissolved in the polymer was removed by flowing the nitrogen gas for 10 minutes; then 75 mg of palladium acetate was added as the hydrogenation reaction catalyst, by dissolving with 180 ml of water wherein 4 times mols of nitric acid was added with respect to Pd. After substituting inside the system with hydrogen gas for 2 times, the content in the autoclave was heated to 50° C. while being pressurized using hydrogen gas to 3 MPa; thereby hydrogenation reaction was carried out for 6 hours (this will be referred as "the first hydrogenation reaction"). Here, the iodine value of the polymer was 35 mg/100 mg.

Next, the autoclave was put back to an atmospheric pressure, then 25 mg of palladium acetate was further added as the hydrogenation reaction catalyst, by dissolving with 60 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the second hydrogenation reaction").

Then, after the content was put back to an ambient temperature and the inside of system was made to an nitrogen atmosphere, the binder aqueous dispersion was obtained by condensing until it reached the solid portion concentration of 40% using the evaporator. Also, 320 parts of NMP was added to 100 parts of this binder aqueous dispersion, then the water was evaporated under reduced pressure; thereby the NMP solution of the above mentioned binder was obtained as the binder composition for the positive electrode. After solidifying 100 gram of said NMP solution by 1 littler of methanol, it was vacuum dried over night at 60° C. to obtain the dried product. When the binder was analyzed by NMR, 20 wt % of the polymer unit having the nitrile group (acrylonitrile monomer unit), 45 wt % of monomer unit derived from 1,3-butadiene, 5 wt % of the polymer unit (methacrylic acid monomer unit) having the hydrophilic group (carboxylic group), 30 wt % of (meth) acrylate polymer unit (2-ethylhexylacrylate monomer unit) were included with respect to the entire amount of the polymer. Here, said monomer unit derived from 1,3-butadiene was formed from 38.8 wt % of linear alkylene polymer unit having carbon atoms of 4 or more, 2.1 wt % of non-hydrogenated butadiene polymer unit, and 4.1 wt % of 1,2-additive polymer unit. Also, the glass transition temperature of the binder was −35° C., and the SP value was 10.0 $(cal/cm^3)^{1/2}$. Note that, the iodine value of the binder was 10 mg/100 mg. Further the swelling degree was 200%.

[The Production of the Slurry Composition for the Positive Electrode and the Positive Electrode]

As the positive electrode active material, 100 parts of lithium cobalate (LiCoO$_2$) (the particle diameter: 12 μm) having the layered structure, 2.0 parts of acetylene black (HS-100: DENKI KAGAKU KOGYO KABUSHIKIGAI-SHA), 1.0 parts in terms of solid portion equivalent amount of NMP solution of said binder (the solid portion concentration of 8.0%) and appropriate amount of NMP were stirred in the planetary mixer; thereby the slurry composition for the positive electrode was obtained. The slurry composition for the positive electrode which was produced was carried out with the evaluation of the slurry stability. The result is shown in Table 1.

As the current collector, the aluminum foil with the thickness of 20 μm was prepared. Said slurry composition for the positive electrode was coated on the aluminum foil by the comma coater so that the thickness after drying was 65 μm or so; then it was dried for 20 minutes at 60° C. and 20 minutes at 120° C. Followed by heat treatment for 2 hours at 150° C. thereby the positive electrode was obtained. This positive electrode was elongated by applying the pressure using the roll press, and the positive electrode made of the aluminum foil and the positive electrode active material layer having the density of 2.5 g/cm$^3$ was produced. Note that, the thickness of the positive electrode was 70 μm. The produced positive electrode was carried out with the electrode flexibility measurement. The result is shown in Table 1.

[The Production of the Negative Electrode and the Slurry Composition for the Negative Electrode]

To the planetary mixer with the disperser, as the negative electrode active material, synthetic graphite (the average particle diameter: 24.5 μm) having the specific surface area of 4 m$^2$/g, 1 parts in terms of solid portion equivalent of 1% aqueous solution of carboxymethylcellulose ("BSH-12" made by DAI-ICHI KOGYO SEIYAKU CO, LTD.) were added, and the solid portion concentration was adjusted to 55% by ion exchange water, then mixed for 60 minutes at 25° C. Next, it was adjusted to the solid portion concentration of 52% by ion exchange water. Then, it was further mixed for 15 minutes at 25° C. thereby the mixture solution was obtained.

To the above mentioned mixture solution, 1.0 part in terms of solid portion equivalent amount of 40% aqueous solution including styrene-butadiene copolymer (the glass transition temperature of −15° C.), and ion exchange water were introduced to adjust the final solid portion concentration to be 50%, then it was further mixed for 10 minutes. This was carried out with the defoaming treatment under reduced pressure; thereby the slurry composition for the negative electrode with good fluidity was obtained.

The slurry composition for the negative electrode was coated on the copper foil having the thickness of 20 μm which is the current collector using a comma coater so that the thickness after drying is 150 μm or so, and then it was dried. This drying was done by moving the copper foil in the oven of 60° C. at the speed of 0.5 m/min over two minutes. Then, the heat treatment was carried out at 120° C. for 2 minutes thereby the negative electrode was obtained. This negative electrode was elongated by applying the pressure using the roll press, and the negative electrode having the negative electrode active material layer with the thickness of 80 μm was obtained.

[The Preparation of the Separator]

Single layer polypropylene separator (the width 65 mm, the length 500 mm, and the thickness 25 μm, produced by the dry method, the porosity of 55%) was cut to a square shape of 5×5 cm$^2$.

[The Production of the Lithium Ion Secondary Battery (Full Cell)]

As outer case of the battery, aluminum wrapping material outer case was prepared. The positive electrode obtained in above was cut to a square shape of 4×4 cm$^2$, and it was placed so that the surface of the current collector side contact with the aluminum wrapping material outer case. On the face of the positive electrode active material layer of the positive electrode, the above mentioned square separator was placed. Further, the negative electrode obtained in the above, was cut to a 4.2×4.2 cm$^2$, then this was placed on the separator so that the surface of the negative electrode active material side faces with the separator. Further, LiPF$_6$ solution having a concentration of 1.0M comprising 1.5% of vinylene carbonate (VC) was filled-in. The solvent of this LiPF$_6$ solution was a mixed solution of ethylene carbonate (EC) and ethylmethylcarbonate (EMC) (EC/EMC=3/7 (volume ratio)). Further, in order to seal the opening of the aluminum wrapping material, it was closed by heat seal of 150° C., thereby the lithium ion secondary battery was produced.

For the obtained lithium ion secondary battery, the high temperature cycle characteristic was evaluated. The result is shown in Table 1.

Example 2

The slurry composition for the positive electrode, the positive electrode and the secondary battery were obtained as same as the example 1, except for using the following binder composition as the binder composition for the positive electrode. The results of each evaluation are shown in Table 1.

[The Production of the Binder Composition for the Positive Electrode]

To the autoclave with the stirrer, 240 parts of ion exchange water, 2.5 parts of alkylbenzene sodium sulfonate, 20 parts of acrylonitrile, 30 parts of butylacrylate, and 5 parts of methacrylic acid were introduced in this order. Then, after substituting the inside of the bottle with the nitrogen, 45 parts of 1,3-butadiene were pressure introduced, and 0.25 parts of ammonium persulfate was added to carry out the polymerization reaction at the reaction temperature of 40° C. Thereby, the polymer including the polymer unit having nitrile group, (meth)acrylate polymer unit, the polymer unit having hydrophilic group and the polymer unit capable of forming conjugated diene monomer were obtained. The polymerization transformation rate was 85%, and the iodine value was 280 mg/100 mg.

400 ml (the entire solid portion 48 gram) of solution which was prepared by diluting said polymer with water to have the entire solid portion concentration of 12 wt % was introduced into 1 litter autoclave with the stirrer, and oxygen dissolved in the polymer was removed by flowing the nitrogen gas for 10 minutes, then 75 mg of palladium acetate was added as the hydrogenation reaction catalyst, by dissolving with 180 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the first hydrogenation reaction"). Here, the iodine value of the polymer was 35 mg/100 mg.

Next, the autoclave was put back to an atmospheric pressure, then 25 mg of palladium acetate was further added as the hydrogenation reaction catalyst, by dissolving with 60 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the second hydrogenation reaction").

Then, after the content was put back to an ambient temperature and the inside of system was made to an nitrogen atmosphere, the binder aqueous dispersion was obtained by condensing until it reached the solid portion concentration of 40% using the evaporator. Also, 320 parts of NMP was added to 100 parts of this binder aqueous dispersion, then the water was evaporated under reduced pressure, thereby the NMP solution of the above mentioned binder was obtained as the binder composition for the positive electrode. After solidifying 100 gram of said NMP solution by 1 littler of methanol, it was vacuum dried over night at 60° C. to obtain the dried product. When the binder was analyzed by NMR, 20 wt % of the polymer unit having the nitrile group (acrylonitrile monomer unit), 45 wt % of monomer unit derived from 1,3-butadiene, 5 wt % of the polymer unit (methacrylic acid monomer unit) having the hydrophilic group (carboxylic group), 30 wt % of (meth) acrylate polymer unit (butylacrylate monomer unit) were included with respect to the entire amount of the polymer. Here, said monomer unit derived from 1,3-butadiene was formed from 38.8 wt % of linear alkylene polymer unit having carbon atoms of 4 or more, 2.1 wt % of non-hydrogenated butadiene polymer unit, and 4.1 wt % of 1,2-additive polymer unit. Also, the glass transition temperature of the binder was −30° C., and the SP value was 10.1 $(cal/cm^3)^{1/2}$. Note that, the iodine value of the binder was 10 mg/100 mg. Further the swelling degree was 280%.

Example 3

The slurry composition for the positive electrode, the positive electrode and the secondary battery were obtained as same as the example 1, except for using the following binder composition as the binder composition for the positive electrode. The results of each evaluation are shown in Table 1.

[The Production of the Binder Composition for the Positive Electrode]

To the autoclave with the stirrer, 240 parts of ion exchange water, 2.5 parts of alkylbenzene sodium sulfonate, 20 parts of acrylonitrile, 30 parts of ethylacrylate, and 5 parts of methacrylic acid were introduced in this order. Then, after substituting the inside of the bottle with the nitrogen, 45 parts of 1,3-butadiene were pressure introduced, and 0.25 parts of ammonium persulfate was added to carry out the polymerization reaction at the reaction temperature of 40° C. Thereby, the polymer including the polymer unit having nitrile group, (meth)acrylate polymer unit, the polymer unit having hydrophilic group and the polymer unit capable of forming conjugated diene monomer were obtained. The polymerization transformation rate was 85%, and the iodine value was 280 mg/100 mg.

400 ml (the entire solid portion 48 gram) of solution which was prepared by diluting said polymer with water to have the entire solid portion concentration of 12 wt % was introduced into 1 litter autoclave with the stirrer, and oxygen dissolved in the polymer was removed by flowing the nitrogen gas for 10 minutes, then 75 mg of palladium acetate was added as the hydrogenation reaction catalyst, by dissolving with 180 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the first hydrogenation reaction"). Here, the iodine value of the polymer was 35 mg/100 mg.

Next, the autoclave was put back to an atmospheric pressure, then 25 mg of palladium acetate was further added as the hydrogenation reaction catalyst, by dissolving with 60 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the second hydrogenation reaction").

Then, after the content was put back to an ambient temperature and the inside of system was made to an nitrogen atmosphere, the binder aqueous dispersion was obtained by condensing until it reached the solid portion concentration of 40% using the evaporator. Also, 320 parts of NMP was added to 100 parts of this binder aqueous dispersion, then the water was evaporated under reduced pressure; thereby the NMP solution of the above mentioned binder was obtained as the binder composition for the positive electrode. After solidifying 100 gram of said NMP solution by 1 littler of methanol, it was vacuum dried over night at 60° C. to obtain the dried product. When the binder was analyzed by NMR, 20 wt % of the polymer unit having the nitrile group (acrylonitrile monomer unit), 45 wt % of monomer unit derived from 1,3-butadiene, 5 wt % of the polymer unit (methacrylic acid monomer unit) having the hydrophilic group (carboxylic group), 30 wt % of (meth) acrylate polymer unit (ethylacrylate monomer unit) were included with respect to the entire amount of the polymer. Here, said monomer unit derived from 1,3-butadiene was formed from 38.8 wt % of linear alkylene polymer unit having carbon atoms of 4 or more, 2.1 wt % of non-hydrogenated butadiene polymer unit, and 4.1 wt % of 1,2-additive polymer unit. Also, the glass transition temperature of the binder was −10° C., and the SP value was 10.3 $(cal/cm^3)^{1/2}$. Note that, the iodine value of the binder was 10 mg/100 mg. Further the swelling degree was 350%.

Example 4

The slurry composition for the positive electrode, the positive electrode and the secondary battery were obtained as same as the example 1, except for using the following binder composition as the binder composition for the positive electrode. The results of each evaluation are shown in Table 1.

[The Production of the Binder Composition for the Positive Electrode]

To the autoclave with the stirrer, 240 parts of ion exchange water, 2.5 parts of alkylbenzene sodium sulfonate, 20 parts of acrylonitrile, 30 parts of laurylacrylate, and 5 parts of methacrylic acid were introduced in this order. Then, after substituting the inside of the bottle with the nitrogen, 45 parts of 1,3-butadiene were pressure introduced, and 0.25 parts of ammonium persulfate was added to carry out the polymerization reaction at the reaction temperature of 40° C. Thereby, the polymer including the polymer unit having nitrile group, (meth)acrylate polymer unit, the polymer unit having hydrophilic group and the polymer unit capable of forming conjugated diene monomer were obtained. The polymerization transformation rate was 85%, and the iodine value was 280 mg/100 mg.

400 ml (the entire solid portion 48 gram) of solution which was prepared by diluting said polymer with water to have the entire solid portion concentration of 12 wt % was introduced into 1 litter autoclave with the stirrer, and oxygen dissolved in the polymer was removed by flowing the nitrogen gas for 10 minutes, then 75 mg of palladium acetate was added as the hydrogenation reaction catalyst, by dissolving with 180 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the first hydrogenation reaction"). Here, the iodine value of the polymer was 35 mg/100 mg.

Next, the autoclave was put back to an atmospheric pressure, then 25 mg of palladium acetate was further added as the hydrogenation reaction catalyst, by dissolving with 60 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the second hydrogenation reaction").

Then, after the content was put back to an ambient temperature and the inside of system was made to an nitrogen atmosphere, the binder aqueous dispersion was obtained by condensing until it reached the solid portion concentration of 40% using the evaporator. Also, 320 parts of NMP was added to 100 parts of this binder aqueous dispersion, then the water was evaporated under reduced pressure, thereby the NMP solution of the above mentioned binder was obtained as the binder composition for the positive electrode. After solidifying 100 gram of said NMP solution by 1 littler of methanol, it was vacuum dried over night at 60° C. to obtain the dried product. When the binder was analyzed by NMR, 20 wt % of the polymer unit having the nitrile group (acrylonitrile monomer unit), 45 wt % of monomer unit derived from 1,3-butadiene, 5 wt % of the polymer unit (methacrylic acid monomer unit) having the hydrophilic group (carboxylic group), 30 wt % of (meth) acrylate polymer unit (laurylacrylate monomer unit) were included with respect to the entire amount of the polymer. Here, said monomer unit derived from 1,3-butadiene was formed from 38.8 wt % of linear alkylene polymer unit having carbon atoms of 4 or more, 2.1 wt % of non-hydrogenated butadiene polymer unit, and 4.1 wt % of 1,2-additive polymer unit. Also, the glass transition temperature of the binder was 30° C., and the SP value was 10 $(cal/cm^3)^{1/2}$. Note that, the iodine value of the binder was 10 mg/100 mg. Further the swelling degree was 195%.

Example 5

The slurry composition for the positive electrode, the positive electrode and the secondary battery were obtained as same as the example 1, except for using the following binder composition as the binder composition for the positive electrode. The results of each evaluation are shown in Table 1.

[The Production of the Binder Composition for the Positive Electrode]

To the autoclave with the stirrer, 240 parts of ion exchange water, 2.5 parts of alkylbenzene sodium sulfonate, 20 parts of acrylonitrile, 40 parts of butylacrylate, and 5 parts of methacrylic acid were introduced in this order. Then, after substituting the inside of the bottle with the nitrogen, 35 parts of 1,3-butadiene were pressure introduced, and 0.25 parts of ammonium persulfate was added to carry out the polymerization reaction at the reaction temperature of 40° C. Thereby, the polymer including the polymer unit having nitrile group, (meth)acrylate polymer unit, the polymer unit having hydrophilic group and the polymer unit capable of forming conjugated diene monomer were obtained. The polymerization transformation rate was 85%, and the iodine value was 280 mg/100 mg.

400 ml (the solid portion 48 gram) of solution which was prepared by diluting said polymer with water to have the entire solid portion concentration of 12 wt % was introduced into 1 litter autoclave with the stirrer, and oxygen dissolved in the polymer was removed by flowing the nitrogen gas for 10 minutes, then 75 mg of palladium acetate was added as the hydrogenation reaction catalyst, by dissolving with 180 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the first hydrogenation reaction"). Here, the iodine value of the polymer was 35 mg/100 mg.

Next, the autoclave was put back to an atmospheric pressure, then 25 mg of palladium acetate was further added as the hydrogenation reaction catalyst, by dissolving with 60 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the second hydrogenation reaction").

Then, after the content was put back to an ambient temperature and the inside of system was made to an nitrogen atmosphere, the binder aqueous dispersion was obtained by condensing until it reached the solid portion concentration of 40% using the evaporator. Also, 320 parts of NMP was added to 100 parts of this binder aqueous dispersion, then the water was evaporated under reduced pressure, thereby the NMP solution of the above mentioned binder was obtained as the binder composition for the positive electrode. After solidifying 100 gram of said NMP solution by 1 littler of methanol, it was vacuum dried over night at 60° C. to obtain the dried product. When the binder was analyzed by NMR, 20 wt % of the polymer unit having the nitrile group (acrylonitrile monomer unit), 35 wt % of monomer unit derived from 1,3-butadiene, 5 wt % of the polymer unit (methacrylic acid monomer unit) having the hydrophilic group (carboxylic acid group), 40 wt % of (meth)acrylate polymer unit (butylacrylate monomer unit) were included with respect to the entire amount of the polymer. Here, said monomer unit derived from 1,3-butadiene was formed from 29.9 wt % of linear alkylene polymer unit having carbon atoms of 4 or more, 1.9 wt % of non-hydrogenated butadiene polymer unit, and 3.2 wt % of 1,2-additive polymer unit. Also, the glass transition temperature of the binder was −40° C., and the SP value was 10.3 (cal/cm³)^(1/2). Note that, the iodine value of the binder was 9 mg/100 mg. Further the swelling degree was 360%.

Example 6

The slurry composition for the positive electrode, the positive electrode and the secondary battery were obtained as same as the example 1, except for using the following binder composition as the binder composition for the positive electrode. The results of each evaluation are shown in Table 1.
[The Production of the Binder Composition for the Positive Electrode]

To the autoclave with the stirrer, 240 parts of ion exchange water, 2.5 parts of alkylbenzene sodium sulfonate, 20 parts of acrylonitrile, 10 parts of butylacrylate, and 5 parts of methacrylic acid were introduced in this order. Then, after substituting the inside of the bottle with the nitrogen, 65 parts of 1,3-butadiene were pressure introduced, and 0.25 parts of ammonium persulfate was added to carry out the polymerization reaction at the reaction temperature of 40° C. Thereby, the polymer including the polymer unit having nitrile group, (meth)acrylate polymer unit, the polymer unit having hydrophilic group and the polymer unit capable of forming conjugated diene monomer were obtained. The polymerization transformation rate was 85%, and the iodine value was 330 mg/100 mg.

400 ml (the entire solid portion 48 gram) of solution which was prepared by diluting said polymer with water to have the entire solid portion concentration of 12 wt % was introduced into 1 litter autoclave with the stirrer, and oxygen dissolved in the polymer was removed by flowing the nitrogen gas for 10 minutes, then 75 mg of palladium acetate was added as the hydrogenation reaction catalyst, by dissolving with 180 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the first hydrogenation reaction"). Here, the iodine value of the polymer was 37 mg/100 mg.

Next, the autoclave was put back to an atmospheric pressure, then 25 mg of palladium acetate was further added as the hydrogenation reaction catalyst, by dissolving with 60 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the second hydrogenation reaction").

Then, after the content was put back to an ambient temperature and the inside of system was made to an nitrogen atmosphere, the binder aqueous dispersion was obtained by condensing until it reached the solid portion concentration of 40% using the evaporator. Also, 320 parts of NMP was added to 100 parts of this binder aqueous dispersion, then the water was evaporated under reduced pressure, thereby the NMP solution of the above mentioned binder was obtained as the binder composition for the positive electrode. After solidifying 100 gram of said NMP solution by 1 littler of methanol, it was vacuum dried over night at 60° C. to obtain the dried product. When the binder was analyzed by NMR, 20 wt % of the polymer unit having the nitrile group (acrylonitrile monomer unit), 65 wt % of monomer unit derived from 1,3-butadiene, 5 wt % of the polymer unit (methacrylic acid monomer unit) having the hydrophilic group (carboxylic acid group), 10 wt % of (meth)acrylate polymer unit (butylacrylate monomer unit) were included with respect to the entire amount of the polymer. Here, said monomer unit derived from 1,3-butadiene was formed from 56.5 wt % of linear alkylene polymer unit having carbon atoms of 4 or more, 2.6 wt % of non-hydrogenated butadiene polymer unit, and 5.9 wt % of 1,2-additive polymer unit. Also, the glass transition temperature of the binder was −38° C., and the SP value was 9.9 (cal/cm³)^(1/2). Note that, the iodine value of the binder was 12 mg/100 mg. Further the swelling degree was 155%.

Example 7

The slurry composition for the positive electrode, the positive electrode and the secondary battery were obtained as same as the example 1, except for using the following binder composition as the binder composition for the positive electrode. The results of each evaluation are shown in Table 1.
[The Production of the Binder Composition for the Positive Electrode]

To the autoclave with the stirrer, 240 parts of ion exchange water, 2.5 parts of alkylbenzene sodium sulfonate, 20 parts of acrylonitrile, 30 parts of butylacrylate, and 5 parts of acrylamide-2-methylpropane sulfonate were introduced in this order. Then, after substituting the inside of the bottle with the nitrogen, 45 parts of 1,3-butadiene were pressure introduced, and 0.25 parts of ammonium persulfate was added to carry out the polymerization reaction at the reaction temperature of 40° C. Thereby, the polymer including the polymer unit having nitrile group, (meth)acrylate polymer unit, the polymer unit having hydrophilic group and the polymer unit capable of forming conjugated diene monomer were obtained. The polymerization transformation rate was 85%, and the iodine value was 280 mg/100 mg.

400 ml (the entire solid portion 48 gram) of solution, which was prepared by diluting said polymer with water to have the entire solid portion concentration of 12 wt %, was introduced into 1 litter autoclave with the stirrer, and oxygen dissolved in the polymer was removed by flowing the nitrogen gas for 10 minutes, then 75 mg of palladium acetate was added as the hydrogenation reaction catalyst, by dissolving with 180 ml od water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the first hydrogenation reaction"). Here, the iodine value of the polymer was 35 mg/100 mg.

Next, the autoclave was put back to an atmospheric pressure, then 25 mg of palladium acetate was further added as the hydrogenation reaction catalyst, by dissolving with 60 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the second hydrogenation reaction").

Then, after the content was put back to an ambient temperature and the inside of system was made to an nitrogen atmosphere, the binder aqueous dispersion was obtained by condensing until it reached the solid portion concentration of 40% using the evaporator. Also, 320 parts of NMP was added to 100 parts of this binder aqueous dispersion, then the water was evaporated under reduced pressure, thereby the NMP solution of the above mentioned binder was obtained as the binder composition for the positive electrode. After solidifying 100 gram of said NMP solution by 1 littler of methanol, it was vacuum dried over night at 60° C. to obtain the dried product. When the binder was analyzed by NMR, 20 wt % of the polymer unit having the nitrile group (acrylonitrile monomer unit), 45 wt % of monomer unit derived from 1,3-butadiene, 5 wt % of the polymer unit (acrylamide-2-methylpropane sulfonate monomer unit) having the hydrophilic group (sulfonic acid group), 30 wt % of (meth)acrylate polymer unit (butylacrylate monomer unit) were included with respect to the entire amount of the polymer. Here, said monomer unit derived from 1,3-butadiene was formed from 38.8 wt % of linear alkylene polymer unit having carbon atoms of 4 or more, 2.1 wt % of non-hydrogenated butadiene polymer unit, and 4.1 wt % of 1,2-additive polymer unit. Also, the glass transition temperature of the binder was −30° C., and the SP value was 10.1 $(cal/cm^3)^{1/2}$. Note that, the iodine value of the binder was 10 mg/100 mg. Further the swelling degree was 280%.

Example 8

The slurry composition for the positive electrode, the positive electrode and the secondary battery were obtained as same as the example 1, except for using the following binder composition as the binder composition for the positive electrode. The results of each evaluation are shown in Table 1.
[The Production of the Binder Composition for the Positive Electrode]

To the autoclave with the stirrer, 240 parts of ion exchange water, 2.5 parts of alkylbenzene sodium sulfonate, 20 parts of acrylonitrile, 40 parts of methylmethacrylate, and 5 parts of methacrylic acid were introduced in this order. Then, after substituting the inside of the bottle with the nitrogen, 35 parts of 1,3-butadiene were pressure introduced, and 0.25 parts of ammonium persulfate was added to carry out the polymerization reaction at the reaction temperature of 40° C. Thereby, the polymer including the polymer unit having nitrile group, (meth)acrylate polymer unit, the polymer unit having hydrophilic group and the polymer unit capable of forming conjugated diene monomer were obtained. The polymerization transformation rate was 85%, and the iodine value was 280 mg/100 mg.

400 ml (the entire solid portion 48 gram) of solution, which was prepared by diluting said polymer with water to have the entire solid portion concentration of 12 wt %, was introduced into 1 litter autoclave with the stirrer, and oxygen dissolved in the polymer was removed by flowing the nitrogen gas for 10 minutes, then 75 mg of palladium acetate was added as the hydrogenation reaction catalyst, by dissolving with 180 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the first hydrogenation reaction"). Here, the iodine value of the polymer was 35 mg/100 mg.

Next, the autoclave was put back to an atmospheric pressure, then 25 mg of palladium acetate was further added as the hydrogenation reaction catalyst, by dissolving with 60 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the second hydrogenation reaction").

Then, after the content was put back to an ambient temperature and the inside of system was made to an nitrogen atmosphere, the binder aqueous dispersion was obtained by condensing until it reached the solid portion concentration of 40% using the evaporator. Also, 320 parts of NMP was added to 100 parts of this binder aqueous dispersion, then the water was evaporated under reduced pressure, thereby the NMP solution of the above mentioned binder was obtained as the binder composition for the positive electrode. After solidifying 100 gram of said NMP solution by 1 littler of methanol, it was vacuum dried over night at 60° C. to obtain the dried product. When the binder was analyzed by NMR, 20 wt % of the polymer unit having the nitrile group (acrylonitrile monomer unit), 35 wt % of monomer unit derived from 1,3-butadiene, 5 wt % of the polymer unit (methacrylic acid monomer unit) having the hydrophilic group (carboxylic group), 40 wt % of (meth)acrylate polymer unit (methylmethacrylate monomer unit) were included with respect to the entire amount of the polymer. Here, said monomer unit derived from 1,3-butadiene was formed from 29.9 wt % of linear alkylene polymer unit having carbon atoms of 4 or more, 1.9 wt % of non-hydrogenated butadiene polymer unit, and 3.2 wt % of 1,2-additive polymer unit. Also, the glass transition temperature of the binder was 30° C., and the SP value was 10.4 $(cal/cm^3)^{1/2}$. Note that, the iodine value of the binder was 9 mg/100 mg. Further the swelling degree was 395%.

Example 9

The slurry composition for the positive electrode, the positive electrode and the secondary battery were obtained as same as the example 1, except for using the following binder composition as the binder composition for the positive electrode. The results of each evaluation are shown in Table 1.
[The Production of the Binder Composition for the Positive Electrode]

To the autoclave with the stirrer, 240 parts of ion exchange water, 2.5 parts of alkylbenzene sodium sulfonate, 20 parts of acrylonitrile, 30 parts of butylacrylate, and 5 parts of methacrylic acid were introduced in this order. Then, after substituting the inside of the bottle with the nitrogen, 45 parts of 1,3-butadiene were pressure introduced, and 0.25 parts of ammonium persulfate was added to carry out the polymerization reaction at the reaction temperature of 40° C. Thereby, the polymer including the polymer unit having nitrile group, (meth)acrylate polymer unit, the polymer unit having hydrophilic group and the polymer unit capable of forming conjugated diene monomer were obtained. The polymerization transformation rate was 85%, and the iodine value was 280 mg/100 mg.

400 ml (the entire solid portion 48 gram) of solution which was prepared by diluting said polymer with water to have the entire solid portion concentration of 12 wt % was introduced into 1 litter autoclave with the stirrer, and oxygen dissolved in the polymer was removed by flowing the nitrogen gas for 10 minutes, then 75 mg of palladium acetate was added as the hydrogenation reaction catalyst, by dissolving with 180 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the first hydrogenation reaction"). Here, the iodine value of the polymer was 35 mg/100 mg.

Next, the autoclave was put back to an atmospheric pressure, then 25 mg of palladium acetate was further added as the hydrogenation reaction catalyst, by dissolving with 60 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the second hydrogenation reaction").

Then, after the content was put back to an ambient temperature and the inside of system was made to an nitrogen atmosphere, the binder aqueous dispersion was obtained by condensing until it reached the solid portion concentration of 40% using the evaporator. Also, 320 parts of NMP was added to 100 parts of this binder aqueous dispersion, then the water was evaporated under reduced pressure, thereby the NMP solution of the above mentioned binder was obtained as the binder composition for the positive electrode. After solidifying 100 gram of said NMP solution by 1 littler of methanol, it was vacuum dried over night at 60° C. to obtain the dried product. When the binder was analyzed by NMR, 20 wt % of the polymer unit having the nitrile group (acrylonitrile monomer unit), 45 wt % of monomer unit derived from 1,3-butadiene, 5 wt % of the polymer unit (methacrylic acid monomer unit) having the hydrophilic group (carboxylic acid group), 30 wt % of (meth)acrylate polymer unit (butylacrylate monomer unit) were included with respect to the entire amount of the polymer. Here, said monomer unit derived from 1,3-butadiene was formed from 38.8 wt % of linear alkylene polymer unit having carbon atoms of 4 or more, 2.1 wt % of non-hydrogenated butadiene polymer unit, and 4.1 wt % of 1,2-additive polymer unit. Also, the glass transition temperature of the binder was −30° C., and the SP value was 10.1 $(cal/cm^3)^{1/2}$. Note that, the iodine value of the binder was 10 mg/100 mg. Further the swelling degree was 280%.

Example 10

The slurry composition for the positive electrode, the positive electrode and the secondary battery were obtained as same as the example 1, except for using the following binder composition as the binder composition for the positive electrode. The results of each evaluation are shown in Table 1.

[The Production of the Binder Composition for the Positive Electrode]

To the autoclave with the stirrer, 240 parts of ion exchange water, 2.5 parts of alkylbenzene sodium sulfonate, 5 parts of acrylonitrile, 30 parts of butylacrylate, and 5 parts of methacrylic acid were introduced in this order. Then, after substituting the inside of the bottle with the nitrogen, 60 parts of 1,3-butadiene were pressure introduced, and 0.25 parts of ammonium persulfate was added to carry out the polymerization reaction at the reaction temperature of 40° C. Thereby, the polymer including the polymer unit having nitrile group, (meth)acrylate polymer unit, the polymer unit having hydrophilic group and the polymer unit capable of forming conjugated diene monomer were obtained. The polymerization transformation rate was 85%, and the iodine value was 300 mg/100 mg.

400 ml (the entire solid portion 48 gram) of solution, which was prepared by diluting said polymer with water to have the entire solid portion concentration of 12 wt %, was introduced into 1 litter autoclave with the stirrer, and oxygen dissolved in the polymer was removed by flowing the nitrogen gas for 10 minutes, then 75 mg of palladium acetate was added as the hydrogenation reaction catalyst, by dissolving with 180 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the first hydrogenation reaction"). Here, the iodine value of the polymer was 36 mg/100 mg.

Next, the autoclave was put back to an atmospheric pressure, then 25 mg of palladium acetate was further added as the hydrogenation reaction catalyst, by dissolving with 60 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the second hydrogenation reaction").

Then, after the content was put back to an ambient temperature and the inside of system was made to an nitrogen atmosphere, the binder aqueous dispersion was obtained by condensing until it reached the solid portion concentration of 40% using the evaporator. Also, 320 parts of NMP was added to 100 parts of this binder aqueous dispersion, then the water was evaporated under reduced pressure, thereby the NMP solution of the above mentioned binder was obtained as the binder composition for the positive electrode. After solidifying 100 gram of said NMP solution by 1 littler of methanol, it was vacuum dried over night at 60° C. to obtain the dried product. When the binder was analyzed by NMR, 5 wt % of the polymer unit having the nitrile group (acrylonitrile monomer unit), 60 wt % of monomer unit derived from 1,3-butadiene, 5 wt % of the polymer unit (methacrylic acid monomer unit) having the hydrophilic group (carboxylic acid group), 30 wt % of (meth)acrylate polymer unit (butylacrylate monomer unit) were included with respect to the entire amount of the polymer. Here, said monomer unit derived from 1,3-butadiene was formed from 52.3 wt % of linear alkylene polymer unit having carbon atoms of 4 or more, 2.3 wt % of non-hydrogenated butadiene polymer unit, and 5.4 wt % of 1,2-additive polymer unit. Also, the glass transition temperature of the binder was −36° C., and the SP value was 9.3 $(cal/cm^3)^{1/2}$. Note that, the iodine value of the binder was 11 mg/100 mg. Further the swelling degree was 120%.

Example 11

The slurry composition for the positive electrode, the positive electrode and the secondary battery were obtained as same as the example 1, except for using the following binder composition as the binder composition for the positive electrode. The results of each evaluation are shown in Table 1.

[The Production of the Binder Composition for the Positive Electrode]

To the autoclave with the stirrer, 240 parts of ion exchange water, 2.5 parts of alkylbenzene sodium sulfonate, 10 parts of acrylonitrile, 30 parts of butylacrylate, and 5 parts of methacrylic acid were introduced in this order. Then, after substituting the inside of the bottle with the nitrogen, 55 parts of 1,3-butadiene were pressure introduced, and 0.25 parts of ammonium persulfate was added to carry out the polymerization reaction at the reaction temperature of 40° C. Thereby, the polymer including the polymer unit having nitrile group, (meth)acrylate polymer unit, the polymer unit having hydrophilic group and the polymer unit capable of forming conjugated diene monomer were obtained. The polymerization transformation rate was 85%, and the iodine value was 280 mg/100 mg.

400 ml (the entire solid portion 48 gram) of solution, which was prepared by diluting said polymer with water to have the entire solid portion concentration of 12 wt %, was introduced into 1 litter autoclave with the stirrer, and oxygen dissolved in the polymer was removed by flowing the nitrogen gas for 10 minutes, then 75 mg of palladium acetate was added as the hydrogenation reaction catalyst, by dissolving with 180 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the first hydrogenation reaction"). Here, the iodine value of the polymer was 35 mg/100 mg.

Next, the autoclave was put back to an atmospheric pressure, then 25 mg of palladium acetate was further added as the hydrogenation reaction catalyst, by dissolving with 60 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the second hydrogenation reaction").

Then, after the content was put back to an ambient temperature and the inside of system was made to an nitrogen atmosphere, the binder aqueous dispersion was obtained by condensing until it reached the solid portion concentration of 40% using the evaporator. Also, 320 parts of NMP was added to 100 parts of this binder aqueous dispersion, then the water was evaporated under reduced pressure, thereby the NMP solution of the above mentioned binder was obtained as the binder composition for the positive electrode. After solidifying 100 gram of said NMP solution by 1 littler of methanol, it was vacuum dried over night at 60° C. to obtain the dried product. When the binder was analyzed by NMR, 10 wt % of the polymer unit having the nitrile group (acrylonitrile monomer unit), 55 wt % of monomer unit derived from 1,3-butadiene, 5 wt % of the polymer unit (methacrylic acid monomer unit) having the hydrophilic group (carboxylic acid group), 30 wt % of (meth)acrylate polymer unit (butylacrylate monomer unit) were included with respect to the entire amount of the polymer. Here, said monomer unit derived from 1,3-butadiene was formed from 47.9 wt % of linear alkylene polymer unit having carbon atoms of 4 or more, 2.1 wt % of non-hydrogenated butadiene polymer unit, and 5 wt % of 1,2-additive polymer unit. Also, the glass transition temperature of the binder was −39° C., and the SP value was 9.6 $(cal/cm^3)^{1/2}$. Note that, the iodine value of the binder was 10 mg/100 mg. Further the swelling degree was 120%.

Example 12

The slurry composition for the positive electrode, the positive electrode and the secondary battery were obtained as same as the example 1, except for using the following binder composition as the binder composition for the positive electrode. The results of each evaluation are shown in Table 1.

[The Production of the Binder Composition for the Positive Electrode]

To the autoclave with the stirrer, 240 parts of ion exchange water, 2.5 parts of alkylbenzene sodium sulfonate, 25 parts of acrylonitrile, 30 parts of butylacrylate, and 5 parts of methacrylic acid were introduced in this order. Then, after substituting the inside of the bottle with the nitrogen, 40 parts of 1,3-butadiene were pressure introduced, and 0.25 parts of ammonium persulfate was added to carry out the polymerization reaction at the reaction temperature of 40° C. Thereby, the polymer including the polymer unit having nitrile group, (meth)acrylate polymer unit, the polymer unit having hydrophilic group and the polymer unit capable of forming conjugated diene monomer were obtained. The polymerization transformation rate was 85%, and the iodine value was 280 mg/100 mg.

400 ml (the entire solid portion 48 gram) of solution which was prepared by diluting said polymer with water to have the entire solid portion concentration of 12 wt % was introduced into 1 litter autoclave with the stirrer, and oxygen dissolved in the polymer was removed by flowing the nitrogen gas for 10 minutes, then 75 mg of palladium acetate was added as the hydrogenation reaction catalyst, by dissolving with 180 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the first hydrogenation reaction"). Here, the iodine value of the polymer was 35 mg/100 mg.

Next, the autoclave was put back to an atmospheric pressure, then 25 mg of palladium acetate was further added as the hydrogenation reaction catalyst, by dissolving with 60 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the second hydrogenation reaction").

Then, after the content was put back to an ambient temperature and the inside of system was made to an nitrogen atmosphere, the binder aqueous dispersion was obtained by condensing until it reached the solid portion concentration of 40% using the evaporator. Also, 320 parts of NMP was added to 100 parts of this binder aqueous dispersion, then the water was evaporated under reduced pressure, thereby the NMP solution of the above mentioned binder was obtained as the binder composition for the positive electrode. After solidifying 100 gram of said NMP solution by 1 littler of methanol, it was vacuum dried over night at 60° C. to obtain the dried product. When the binder was analyzed by NMR, 25 wt % of the polymer unit having the nitrile group (acrylonitrile monomer unit), 40 wt % of monomer unit derived from 1,3-butadiene, 5 wt % of the polymer unit (methacrylic acid monomer unit) having the hydrophilic group (carboxylic acid group), 30 wt % of (meth)acrylate polymer unit (butylacrylate monomer unit) were included with respect to the entire amount of the polymer. Here, said monomer unit derived from 1,3-butadiene was formed from 34.3 wt % of linear alkylene polymer unit having carbon atoms of 4 or more, 2.1 wt % of non-hydrogenated butadiene polymer unit, and 3.6 wt % of 1,2-additive polymer unit. Also, the glass transition temperature of the binder was −20° C., and the SP value was 10.4 $(cal/cm^3)^{1/2}$. Note that, the iodine value of the binder was 10 mg/100 mg. Further the swelling degree was 430%.

Example 13

The slurry composition for the positive electrode, the positive electrode and the secondary battery were obtained as same as the example 1, except for using the following binder composition as the binder composition for the positive electrode. The results of each evaluation are shown in Table 1.

[The Production of the Binder Composition for the Positive Electrode]

To the autoclave with the stirrer, 240 parts of ion exchange water, 2.5 parts of alkylbenzene sodium sulfonate, 20 parts of acrylonitrile, 30 parts of butylacrylate, and 4.5 parts of methacrylic acid were introduced in this order. Then, after substituting the inside of the bottle with the nitrogen, 45.5 parts of 1,3-butadiene were pressure introduced, and 0.25 parts of ammonium persulfate was added to carry out the polymerization reaction at the reaction temperature of 40° C. Thereby, the polymer including the polymer unit having nitrile group, (meth)acrylate polymer unit, the polymer unit having hydrophilic group and the polymer unit capable of forming conjugated diene monomer were obtained. The polymerization transformation rate was 85%, and the iodine value was 280 mg/100 mg.

400 ml (the entire solid portion 48 gram) of solution, which was prepared by diluting said polymer with water to have the entire solid portion concentration of 12 wt %, was introduced into 1 litter autoclave with the stirrer, and oxygen dissolved in the polymer was removed by flowing the nitrogen gas for 10 minutes, then 75 mg of palladium acetate was added as the hydrogenation reaction catalyst, by dissolving with 180 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the first hydrogenation reaction"). Here, the iodine value of the polymer was 35 mg/100 mg.

Next, the autoclave was put back to an atmospheric pressure, then 25 mg of palladium acetate was further added as the hydrogenation reaction catalyst, by dissolving with 60 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the second hydrogenation reaction").

Then, after the content was put back to an ambient temperature and the inside of system was made to an nitrogen atmosphere, the binder aqueous dispersion was obtained by condensing until it reached the solid portion concentration of 40% using the evaporator. Also, 320 parts of NMP was added to 100 parts of this binder aqueous dispersion, then the water was evaporated under reduced pressure, thereby the NMP solution of the above mentioned binder was obtained as the binder composition for the positive electrode. After solidifying 100 gram of said NMP solution by 1 littler of methanol, it was vacuum dried over night at 60° C. to obtain the dried product. When the binder was analyzed by NMR, 20 wt % of the polymer unit having the nitrile group (acrylonitrile monomer unit), 45.5 wt % of monomer unit derived from 1,3-butadiene, 4.5 wt % of the polymer unit (methacrylic acid monomer unit) having the hydrophilic group (carboxylic acid group), 30 wt % of (meth)acrylate polymer unit (butylacrylate monomer unit) were included with respect to the entire amount of the polymer. Here, said monomer unit derived from 1,3-butadiene was formed from 39.3 wt % of linear alkylene polymer unit having carbon atoms of 4 or more, 2.1 wt % of non-hydrogenated butadiene polymer unit, and 4.1 wt % of 1,2-additive polymer unit. Also, the glass transition temperature of the binder was −30° C., and the SP value was 10.0 $(cal/cm^3)^{1/2}$. Note that, the iodine value of the binder was 10 mg/100 mg. Further the swelling degree was 250%.

[The Production of the Slurry Composition for the Positive Electrode, and the Positive Electrode]

As the positive electrode active material, 100 parts of lithium cobalate (LiCoO$_2$) (the particle diameter: 12 µm) having the layered structure, 2.0 parts of acetylene black (HS-100: DENKI KAGAKU KOGYO KABUSHIKIGAISHA), 1.0 parts in terms of solid portion equivalent amount of NMP solution of said binder (the solid portion concentration of 8.0%) and appropriate amount of NMP were stirred in the planetary mixer; thereby the slurry composition for the positive electrode was obtained. The slurry composition for the positive electrode which was produced was carried out with the evaluation of the slurry stability. The result is shown in Table 1.

As the current collector, the aluminum foil with the thickness of 20 µm was prepared. Said slurry composition for the positive electrode was coated on the aluminum foil by the comma coater so that the thickness after drying is 65 µm or so; then it was dried for 20 minutes at 60° C. and 20 minutes at 120° C. Followed by heat treatment for 2 hours at 150° C. thereby the positive electrode was obtained. This positive electrode was elongated by applying pressure using the roll press, and the positive electrode made of the aluminum foil and the positive electrode active material layer having the density of 2.5 g/cm$^3$ were produced. Note that, the thickness of the positive electrode was 70 µm. The produced positive electrode was carried out with the electrode flexibility measurement. The result is shown in Table 1.

[The Production of the Lithium Ion Secondary Battery (Half-Cell)]

Said positive electrode was cut into a disk form having the diameter of 16 mm, then to the positive electrode active material layer face of this positive electrode, the separator made of polypropylene porous film having the diameter of 18 mm and the thickness of 25 µm, the lithium metal used as the negative electrode, and the expand metal were stacked in this order. Then, this was placed in the coin shaped outer container (the diameter of 20 mm, the height of 1.8 mm, the thickness of the stainless steel of 0.25 mm) made of stainless steel provided with polypropylene packing. The electrolytic solution was introduced into this container so that the air is not left in, and the polypropylene packing was fixed to the outer container by placing the stainless steel having the thickness of 0.2 mm over. Thereby the battery can was sealed, and the lithium ion coin battery (half-cell) having the diameter of 20 mm and the thickness of about 2 mm was produced. Note that, as for the electrolytic solution, the solution dissolving 1 mol/litter of $LiPF_6$ in the mixed solvent of ethylene carbonate (EC) and ethylmethyl carbonate (EMC) of EC: EMC=3:7 (the volume ratio at 20° C.) was used. The high temperature characteristic was evaluated using this lithium ion secondary battery. The result is shown in Table 1.

[The Production of the Slurry Composition for the Negative Electrode and the Negative Electrode]

To the planetary mixer with the disperser, as the negative electrode active material, synthetic graphite (the average particle diameter: 24.5 μm) having the specific surface area of 4 $m^2$/g, 1 parts in terms of solid portion equivalent of 1% aqueous solution of carboxymethylcellulose ("BSH-12" made by DAI-ICHI KOGYO SEIYAKU CO, LTD.) as a dispersing agent were added, and the solid portion concentration was adjusted to 55% by ion exchange water, then mixed for 60 minutes at 25° C. Next, it was adjusted to the solid portion concentration of 52% by ion exchange water. Then, it was further mixed for 15 minutes at 25° C. thereby the mixture solution was obtained.

To the above mentioned mixture solution, 1.0 part in terms of solid portion equivalent amount of 40% aqueous solution including styrene-butadiene copolymer (the glass transition temperature of −15° C.), and ion exchange water were introduced to adjust the final solid portion concentration to be 50%, then it was further mixed for 10 minutes. This was carried out with the defoaming treatment under reduced pressure, thereby the slurry composition for the negative electrode with good fluidity was obtained.

The slurry composition for the negative electrode was coated on the copper foil having the thickness of 20 μm which is the current collector using a comma coater so that the thickness after drying is 150 μm or so, then it was dried. This drying was done by moving the copper foil in the oven of 60° C. at the speed of 0.5 m/min over two minutes. Then, the heat treatment was carried out at 120° C. for 2 minutes; thereby the negative electrode was obtained. This negative electrode was elongated by applying pressure using the roll press, and the negative electrode having the negative electrode active material layer with the thickness of 80 μm was obtained.

[The Preparation of the Separator]

Single layer polypropylene separator (the width 65 mm, the length 500 mm, and the thickness 25 μm, produced by the dry method, the porosity of 55%) was cut to a square shape of 5×5 $cm^2$.

[The Production of the Lithium Ion Secondary Battery (Full Cell)]

As outer case of the battery, aluminum wrapping material outer case was prepared. The positive electrode obtained in above was cut to a square shape of 4×4 $cm^2$, and it was placed so that the surface of the current collector side contact with the aluminum wrapping material outer case. On the face of the positive electrode active material layer of the positive electrode, the above mentioned square separator was placed. Further, the negative electrode obtained in the above, was cut to a 4.2×4.2 $cm^2$, then this was placed on the separator so that the surface of the negative electrode active material side faces with the separator. Further, $LiPF_6$ solution having a concentration of 1.0M comprising 1.5% of vinylene carbonate (VC) was filled-in. The solvent of this $LiPF_6$ solution was a mixed solution of ethylene carbonate (EC) and ethylmethylcarbonate (EMC) (EC/EMC=3/7 (volume ratio)). Further, in order to seal the opening of the aluminum wrapping material, it was closed by heat seal of 150° C., thereby the lithium ion secondary battery was produced.

For the obtained lithium ion secondary battery, the high temperature cycle characteristic was evaluated. The result is shown in Table 1.

Comparative Example 1

The slurry composition for the positive electrode, the positive electrode and the secondary battery were obtained as same as the example 1, except for using the following binder composition as the binder composition for the positive electrode. The results of each evaluation are shown in Table 1.

[The Production of the Binder Composition for the Positive Electrode]

To the polymer can A, 8.8 parts of 2-ethylhexyl acrylate, 1 part of acrylonitrile, 0.12 part of sodium lauryl sulfate, 79 parts of ion exchange water were added; and 0.2 parts of ammonium persulfate as the polymerization initiator and 10 parts of the ion exchange water were added, then stirred for 90 minutes by heating at 60° C. Then, to other polymer can B, 79.2 parts of 2-ethylhexyl acrylate, 9 parts of acrylonitrile, 2.0 parts of methacrylic acid, 0.7 parts of sodium lauryl sulfate, and 46 parts of ion exchange water were added and stirred. Then, the produced emulsion was sequentially added to the polymer can A from the polymer can B using about 180 minutes, and after stirring for about 120 minutes, then the reaction was completed by cooling when the monomer consumption reached to 95%. Then, pH was adjusted by 4% NaOH aqueous solution, thereby the aqueous dispersion of the polymer was obtained.

To 100 parts of this binder aqueous solution, 320 parts of NMP was added, and the water was evaporated; however NMP did not dissolve, hence the evaluations following this were unable to carry out. After solidifying 100 gram of said NMP solution by 1 littler of methanol, it was vacuum dried over night at 60° C. to obtain the dried product. When the binder was analyzed by NMR, 10 wt % of the polymer unit having the nitrile group (acrylonitrile monomer unit), 2 wt % of the polymer unit (methacrylic acid monomer unit) having the hydrophilic group (carboxylic acid group), 88 wt % of (meth)acrylate polymer unit (2-ethylhexylacrylate monomer unit) were included with respect to the entire amount of the polymer. Also, the glass transition temperature of the binder was less than −50° C., and the SP value was 9.8 $(cal/cm^3)^{1/2}$. Note that, the iodine value of the binder was 0 mg/100 mg. Further the swelling degree was 110%.

Comparative Example 2

The slurry composition for the positive electrode, the positive electrode and the secondary battery were obtained as same as the example 1, except for using the following binder composition as the binder composition for the positive electrode. The results of each evaluation are shown in Table 1.

[The Production of the Binder Composition for the Positive Electrode]

To the autoclave with the stirrer, 240 parts of ion exchange water, 2.5 parts of alkylbenzene sodium sulfonate, 35 parts of acrylonitrile, and 5 parts of methacrylic acid were introduced in this order. Then, after substituting the inside of the bottle with the nitrogen, 60 parts of 1,3-butadiene were pressure introduced, and 0.25 parts of ammonium persulfate was added to carry out the polymerization reaction at the reaction temperature of 40° C. Thereby, the polymer including the polymer unit having nitrile group, the polymer unit having hydrophilic group and the polymer unit capable of forming conjugated diene monomer were obtained. The polymerization transformation rate was 85%, and the iodine value was 300 mg/100 mg.

400 ml (the entire solid portion 48 gram) of solution, which was prepared by diluting said polymer with water to have the entire solid portion concentration of 12 wt %, was introduced into 1 litter autoclave with the stirrer, and oxygen dissolved in the polymer was removed by flowing the nitrogen gas for 10 minutes, then 75 mg of palladium acetate was added as the hydrogenation reaction catalyst, by dissolving with 180 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the first hydrogenation reaction"). Here, the iodine value of the polymer was 36 mg/100 mg.

Next, the autoclave was put back to an atmospheric pressure, then 25 mg of palladium acetate was further added as the hydrogenation reaction catalyst, by dissolving with 60 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the second hydrogenation reaction").

Then, after the content was put back to an ambient temperature and the inside of system was made to an nitrogen atmosphere, the binder aqueous dispersion was obtained by condensing until it reached the solid portion concentration of 40% using the evaporator. Also, 320 parts of NMP was added to 100 parts of this binder aqueous dispersion, then the water was evaporated under reduced pressure, thereby the NMP solution of the above mentioned binder was obtained as the binder composition for the positive electrode. After solidifying 100 gram of said NMP solution by 1 littler of methanol, it was vacuum dried over night at 60° C. to obtain the dried product. When the binder was analyzed by NMR, 35 wt % of the polymer unit having the nitrile group (acrylonitrile monomer unit), 60 wt % of monomer unit derived from 1,3-butadiene, and 5 wt % of the polymer unit (methacrylic acid monomer unit) having the hydrophilic group (carboxylic acid group) were included with respect to the entire amount of the polymer. Here, said monomer unit derived from 1,3-butadiene was formed from 52.3 wt % of linear alkylene polymer unit having carbon atoms of 4 or more, 2.3 wt % of non-hydrogenated butadiene polymer unit, and 5.4 wt % of 1,2-additive polymer unit. Also, the glass transition temperature of the binder was −28° C., and the SP value was 10.6 $(cal/cm^3)^{1/2}$. Note that, the iodine value of the binder was 11 mg/100 mg. Further the swelling degree was 495%.

Comparative Example 3

The slurry composition for the positive electrode, the positive electrode and the secondary battery were obtained as same as the example 1, except for using the following binder composition as the binder composition for the positive electrode. The results of each evaluation are shown in Table 1.

[The Production of the Binder Composition for the Positive Electrode]

To the autoclave with the stirrer, 240 parts of ion exchange water, 2.5 parts of alkylbenzene sodium sulfonate, 43 parts of acrylonitrile, 10 parts of ethylacrylate, and 2 parts of methacrylic acid were introduced in this order. Then, after substituting the inside of the bottle with the nitrogen, 45 parts of 1,3-butadiene were pressure introduced, and 0.25 parts of ammonium persulfate was added to carry out the polymerization reaction at the reaction temperature of 40° C. Thereby, the polymer including the polymer unit having nitrile group, (meth)acrylate polymer unit, the polymer unit having hydrophilic group and the polymer unit capable of forming conjugated diene monomer were obtained. The polymerization transformation rate was 85%, and the iodine value was 280 mg/100 mg.

400 ml (the entire solid portion 48 gram) of solution, which was prepared by diluting said polymer with water to have the entire solid portion concentration of 12 wt %, was introduced into 1 litter autoclave with the stirrer, and oxygen dissolved in the polymer was removed by flowing the nitrogen gas for 10 minutes, then 75 mg of palladium acetate was added as the hydrogenation reaction catalyst, by dissolving with 180 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the first hydrogenation reaction"). Here, the iodine value of the polymer was 35 mg/100 mg.

Next, the autoclave was put back to an atmospheric pressure, then 25 mg of palladium acetate was further added as the hydrogenation reaction catalyst, by dissolving with 60 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the second hydrogenation reaction").

Then, after the content was put back to an ambient temperature and the inside of system was made to an nitrogen atmosphere, the binder aqueous dispersion was obtained by condensing until it reached the solid portion concentration of 40% using the evaporator. Also, 320 parts of NMP was added to 100 parts of this binder aqueous dispersion, then the water was evaporated under reduced pressure, thereby the NMP solution of the above mentioned binder was obtained as the binder composition for the positive electrode. After solidifying 100 gram of said NMP solution by 1 littler of methanol, it was vacuum dried over night at 60° C. to obtain the dried product. When the binder was analyzed by NMR, 43 wt % of the polymer unit having the nitrile group (acrylonitrile monomer unit), 45 wt % of monomer unit derived from 1,3-butadiene, 2 wt % of the polymer unit (methacrylic acid monomer unit) having the hydrophilic group (carboxylic acid group), 10 wt % of (meth)acrylate polymer unit (ethylacrylate monomer unit) were included with respect to the entire amount of the polymer. Here, said monomer unit derived from 1,3-butadiene was formed from 38.8 wt % of linear alkylene polymer unit having carbon atoms of 4 or more, 2.1 wt % of non-hydrogenated butadiene polymer unit, and 4.1 wt % of 1,2-additive polymer unit. Also, the glass transition temperature of the binder was −10° C., and the SP value was 11.1 $(cal/cm^3)^{1/2}$. Note that, the iodine value of the binder was 10 mg/100 mg. Further the swelling degree was 760%.

Comparative Example 4

The slurry composition for the positive electrode, the positive electrode and the secondary battery were obtained as same as the example 1, except for using the following binder composition as the binder composition for the positive electrode. The results of each evaluation are shown in Table 1.
[The Production of the Binder Composition for the Positive Electrode]
To the autoclave with the stirrer, 240 parts of ion exchange water, 2.5 parts of alkylbenzene sodium sulfonate, and 55 parts of acrylonitrile were introduced in this order. Then, after substituting the inside of the bottle with the nitrogen, 45 parts of 1,3-butadiene were pressure introduced, and 0.25 parts of ammonium persulfate was added to carry out the polymerization reaction at the reaction temperature of 40° C. Thereby, the polymer including the polymer unit having nitrile group, and the polymer unit capable of forming conjugated diene monomer were obtained. The polymerization transformation rate was 85%, and the iodine value was 280 mg/100 mg.

400 ml (the solid portion 48 gram) of solution, which was prepared by diluting said polymer with water to have the entire solid portion concentration of 12 wt %, was introduced into 1 litter autoclave with the stirrer, and oxygen dissolved in the polymer was removed by flowing the nitrogen gas for 10 minutes, then 75 mg of palladium acetate was added as the hydrogenation reaction catalyst, by dissolving with 180 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the first hydrogenation reaction"). Here, the iodine value of the polymer was 35 mg/100 mg.

Next, the autoclave was put back to an atmospheric pressure, then 25 mg of palladium acetate was further added as the hydrogenation reaction catalyst, by dissolving with 60 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the second hydrogenation reaction").

Then, after the content was put back to an ambient temperature and the inside of system was made to an nitrogen atmosphere, the binder aqueous dispersion was obtained by condensing until it reached the solid portion concentration of 40% using the evaporator. Also, 320 parts of NMP was added to 100 parts of this binder aqueous dispersion, then the water was evaporated under reduced pressure, thereby the NMP solution of the above mentioned binder was obtained as the binder composition for the positive electrode. After solidifying 100 gram of said NMP solution by 1 littler of methanol, it was vacuum dried over night at 60° C. to obtain the dried product. When the binder was analyzed by NMR, 55 wt % of the polymer unit having the nitrile group (acrylonitrile monomer unit), 45 wt % of monomer unit derived from 1,3-butadiene were included with respect to the entire amount of the polymer. Here, said monomer unit derived from 1,3-butadiene was formed from 38.8 wt % of linear alkylene polymer unit having carbon atoms of 4 or more, 2.1 wt % of non-hydrogenated butadiene polymer unit, and 4.1 wt % of 1,2-additive polymer unit. Also, the glass transition temperature of the binder was −15° C., and the SP value was 11.5 $(cal/cm^3)^{1/2}$. Note that, the iodine value of the binder was 10 mg/100 mg. Further the swelling degree was 965%.

Comparative Example 5

The slurry composition for the positive electrode, the positive electrode and the secondary battery were obtained as same as the example 1, except for using the following binder composition as the binder composition for the positive electrode. The results of each evaluation are shown in Table 1.
[The Production of the Binder Composition for the Positive Electrode]
To the autoclave with the stirrer, 240 parts of ion exchange water, 2.5 parts of alkylbenzene sodium sulfonate, 5 parts of acrylonitrile, 10 parts of butylacrylate, and 5 parts of methacrylic acid were introduced in this order. Then, after substituting the inside of the bottle with the nitrogen, 80 parts of 1,3-butadiene were pressure introduced, and 0.25 parts of ammonium persulfate was added to carry out the polymerization reaction at the reaction temperature of 40° C. Thereby, the polymer including the polymer unit having nitrile group, (meth)acrylate polymer unit, the polymer unit having hydrophilic group and the polymer unit capable of forming conjugated diene monomer were obtained. The polymerization transformation rate was 85%, and the iodine value was 350 mg/100 mg.

400 ml (the entire solid portion 48 gram) of solution which was prepared by diluting said polymer with water to have the entire solid portion concentration of 12 wt % was introduced into 1 litter autoclave with the stirrer, and oxygen dissolved in the polymer was removed by flowing the nitrogen gas for 10 minutes, then 75 mg of palladium acetate was added as the hydrogenation reaction catalyst, by dissolving with 180 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the first hydrogenation reaction"). Here, the iodine value of the polymer was 40 mg/100 mg.

Next, the autoclave was put back to an atmospheric pressure, then 25 mg of palladium acetate was further added as the hydrogenation reaction catalyst, by dissolving with 60 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the second hydrogenation reaction").

Then, after the content was put back to an ambient temperature and the inside of system was made to an nitrogen atmosphere, the binder aqueous dispersion was obtained by condensing until it reached the solid portion concentration of 40% using the evaporator. Also, 320 parts of NMP was added to 100 parts of this binder aqueous dispersion, then the water was evaporated under reduced pressure, thereby the NMP solution of the above mentioned binder was obtained as the binder composition for the positive electrode. After solidifying 100 gram of said NMP solution by 1 littler of methanol, it was vacuum dried over night at 60° C. to obtain the dried product. When the binder was analyzed by NMR, 5 wt % of the polymer unit having the nitrile group (acrylonitrile monomer unit), 80 wt % of monomer unit derived from 1,3-butadiene, 5 wt % of the polymer unit (methacrylic acid monomer unit) having the hydrophilic group (carboxylic acid group), 10 wt % of (meth)acrylate polymer unit (butylacrylate monomer unit) were included with respect to the entire amount of the polymer. Here, said monomer unit derived from 1,3-butadiene was formed from 69.6 wt % of linear alkylene polymer unit having carbon atoms of 4 or more, 3.2 wt % of non-hydrogenated butadiene polymer unit, and 7.2 wt % of 1,2-additive polymer unit. Also, the glass transition temperature of the binder was −38° C., and the SP value was 9.0 $(cal/cm^3)^{1/2}$. Note that, the iodine value of the binder was 1 mg/100 mg. Further the swelling degree was 80%.

TABLE 1

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Binder material | | | | | | | | | | | |
| Monomer (parts by weight) | BD(butadiene) | 45 | 45 | 45 | 45 | 35 | 65 | 45 | 35 | 45 | 60 |
| | AN (acrylonitrile) | 20 | 20 | 20 | 20 | 20 | 20 | 20 | 20 | 20 | 5 |
| | MMA(methyl methacrylate) | | | | | | | | 40 | | |
| | EA (ethyl acrylate) | | | | 30 | | | | | | |
| | BA (butyl acrylate) | | 30 | | | 40 | 10 | 30 | | 30 | 30 |
| | 2EHA (2-ethylhexyl acrylate) | 30 | | | | | | | | | |
| | lauryl acrylate | | | | | 30 | | | | | |
| | MAA (methacrylic acid) | 5 | 5 | 5 | 5 | 5 | 5 | | 5 | 5 | 5 |
| | AMPS (acrylamide-2-methyl propane sulfonate) | | | | | | | 5 | | | |
| Hydrogenation condition | | | | | | | | | | | |
| Added amount (mg) of palladium acetate | Fiirst hydrogenation reaction | 75 | 75 | 75 | 75 | 75 | 75 | 75 | 75 | 75 | 75 |
| | Second hydrogenation reaction | 25 | 25 | 25 | 25 | 25 | 25 | 25 | 25 | 25 | 25 |
| Binder composition | | | | | | | | | | | |
| Polymer unit having nitrile group (wt %) | | 20 | 20 | 20 | 20 | 20 | 20 | 20 | 20 | 20 | 5 |
| (meth)acrylate polymer unit (wt %) | | 30 | 30 | 30 | 30 | 40 | 10 | 30 | 40 | 30 | 30 |
| Polymer unit having hydrpgenationgroup (wt %) | | 5 | 5 | 5 | 5 | 5 | 5 | 5 | 5 | 5 | 5 |
| Linear alkylene polymer unit (wt %) | | 38.8 | 38.8 | 38.8 | 38.8 | 29.9 | 56.5 | 38.8 | 29.9 | 38.8 | 52.3 |
| Non-hydrogenated polymer unit (wt %) | | 2.1 | 2.1 | 2.1 | 2.1 | 1.9 | 2.6 | 2.1 | 1.9 | 2.1 | 2.3 |
| 1,2-additive polymer unit (wt %) | | 4.1 | 4.1 | 4.1 | 4.1 | 3.2 | 5.4 | 4.1 | 3.2 | 4.1 | 5.4 |
| Glass transition temperature (° C.) | | −35 | −30 | −10 | 30 | −40 | −38 | −30 | 30 | −30 | −36 |
| SP value $(cal/cm^3)^{1/2}$ | | 10.0 | 10.1 | 10.3 | 10 | 10.3 | 9.9 | 10.1 | 10.4 | 10.1 | 9.3 |
| Iodine value (mg/100 mg) | | 10 | 10 | 10 | 10 | 9 | 12 | 10 | 9 | 10 | 11 |
| Swelling degree | | 200% | 280% | 350% | 195% | 360% | 155% | 280% | 395% | 280% | 120% |
| Slurry stability | | A | A | A | C | B | C | A | C | A | C |
| Electrode flexibility | | A | B | B | D | B | B | B | D | B | B |
| High temperature cycle characteristic (half-cell) | | — | — | — | — | — | — | — | — | — | — |
| High temperature cycle characteristic (full-cell) | | 80% | 70% | 64% | 56% | 65% | 61% | 78% | 52% | 62% | 64% |

| | | Example 11 | Example 12 | Example 13 | Comparative example 1 | Comparative example 2 | Comparative example 3 | Comparative example 4 | Comparative example 5 |
|---|---|---|---|---|---|---|---|---|---|
| Binder material | | | | | | | | | |
| Monomer (parts by weight) | BD(butadiene) | 55 | 40 | 45.5 | 0 | 60 | 45 | 45 | 80 |
| | AN (acrylonitrile) | 10 | 25 | 20 | 10 | 35 | 43 | 55 | 5 |
| | MMA(methyl methacrylate) | | | | | | | | |
| | EA (ethyl acrylate) | | | | | | 10 | | |
| | BA (butyl acrylate) | 30 | 30 | 30 | | 0 | | 0 | 10 |
| | 2EHA (2-ethylhexyl acrylate) | | | | 88 | | | | |
| | lauryl acrylate | | | | | | | | |
| | MAA (methacrylic acid) | 5 | 5 | 4.5 | 2 | 5 | 2 | 0 | 5 |
| | AMPS (acrylamide-2-methyl propane sulfonate) | | | | | | | | |
| Hydrogenation condition | | | | | | | | | |
| Added amount (mg) of palladium acetate | Fiirst hydrogenation reaction | 75 | 75 | 75 | — | 75 | 75 | 75 | 75 |
| | Second hydrogenation reaction | 25 | 25 | 25 | — | 25 | 25 | 25 | 25 |
| Binder composition | | | | | | | | | |
| Polymer unit having nitrile group (wt %) | | 10 | 25 | 20 | 10 | 35 | 43 | 55 | 5 |
| (meth)acrylate polymer unit (wt %) | | 30 | 30 | 30 | 88 | 0 | 10 | 0 | 10 |
| Polymer unit having hydrpgenationgroup (wt %) | | 5 | 5 | 4.5 | 2 | 5 | 2 | 0 | 5 |
| Linear alkylene polymer unit (wt %) | | 47.9 | 34.3 | 39.3 | — | 52.3 | 38.8 | 38.8 | 69.6 |
| Non-hydrogenated polymer unit (wt %) | | 2.1 | 2.1 | 2.1 | — | 2.3 | 2.1 | 2.1 | 3.2 |
| 1,2-additive polymer unit (wt %) | | 5.0 | 3.6 | 4.1 | — | 5.4 | 4.1 | 4.1 | 7.2 |
| Glass transition temperature (° C.) | | −39 | −20 | −30 | <−50 | −28 | −10 | −15 | −38 |

TABLE 1-continued

| | | | | | | | | |
|---|---|---|---|---|---|---|---|---|
| SP value (cal/cm³)^(1/2) | 9.6 | 10.4 | 10.0 | 9.8 | 10.6 | 11.1 | 11.5 | 9.0 |
| Iodine value (mg/100 mg) | 10 | 10 | 10 | 0 | 11 | 10 | 10 | 15 |
| Swelling degree | 120% | 430% | 250% | 110% | 495% | 760% | 965% | 80% |
| Slurry stability | B | B | A | — | A | A | A | B |
| Electrode flexibility | B | B | B | — | C | B | C | C |
| High temperature cycle characteristic (half-cell) | — | — | 75% | — | — | — | — | — |
| High temperature cycle characteristic (full-cell) | 67% | 65% | 78% | — | 35% | 30% | 28% | 10% |

As shown in Table 1, in case the binder composition of the examples 1 to 13, the slurry composition excellent in slurry stability was obtained. On the other hand, in case of using the binder composition of the comparative example 1, the slurry composition was unable to obtain since NMP did not dissolve. Therefore, for the comparative example 1, the slurry stability, the electrode flexibility, the high temperature characteristic were unable to evaluate.

Also, the positive electrode using the binder composition of examples 1 to 3, 5 to 7, and 9 to 13 had excellent electrode flexibility than the positive electrode using the binder composition of the comparative examples 2 and 4.

Further, the battery using the binder composition of the examples 1 to 13 has excellent high temperature characteristic than the battery using the binder composition of the comparative examples 2 to 5.

That is, the binder composition of the examples 1 to 13 has excellent balance of the slurry stability, the electrode flexibility and the high temperature characteristic compared to the binder composition of the comparative examples 1 to 5.

In the present invention, the examples 1 to 3, 5, 7, 9, 11 to 13 are preferable which have excellent balance of the slurry stability, the electrode flexibility and the high temperature cycle characteristic; and the examples 1, 2, 7 and 13 are particularly preferable which has particularly excellent balance of the slurry stability, the electrode flexibility and the high temperature cycle characteristic.

The invention claimed is:

1. A binder composition for the secondary battery positive electrode comprising a binder including a polymer unit having nitrile group, (meth)acrylate polymer unit, a polymer unit having hydrophilic group, and a polymer unit of linear alkylene wherein the linear alkylene has carbon atoms of 4 or more; wherein,
a swelling degree of said binder in an electrolytic solution dissolved with LiPF$_6$ of a concentration of 1.0 mol/L in a mixture solution formed by mixing ethylene carbonate (EC) and diethyl carbonate (DEC) having the volume ratio at 20° C. of EC:DEC=1:2 is 100 to 500%.

2. The binder composition for the secondary battery positive electrode as set forth in claim 1, wherein a content ratio of said (meth)acrylate polymer unit is 5 to 50 wt %.

3. The binder composition for the secondary battery positive electrode as set forth in claim 2, wherein a content ratio of said polymer unit having nitrile group is 2 to 50 wt %.

4. The binder composition for the secondary battery positive electrode as set forth in claim 3, wherein a content ratio of said polymer unit having hydrophilic group is 0.05 to 20 wt %.

5. The binder composition for the secondary battery positive electrode as set forth in claim 3, wherein carbon atoms of alkyl groups bonding with a non-carbonyl oxygen atom of said (meth)acrylate polymer unit is 4 to 10.

6. The binder composition for the secondary battery positive electrode as set forth in claim 2, wherein a content ratio of said polymer unit having hydrophilic group is 0.05 to 20 wt %.

7. The binder composition for the secondary battery positive electrode as set forth in claim 2, wherein carbon atoms of alkyl groups bonding with a non-carbonyl oxygen atom of said (meth)acrylate polymer unit is 4 to 10.

8. The binder composition for the secondary battery positive electrode as set forth in claim 1, wherein a content ratio of said polymer unit having nitrile group is 2 to 50 wt %.

9. The binder composition for the secondary battery positive electrode as set forth in claim 8, wherein a content ratio of said polymer unit having hydrophilic group is 0.05 to 20 wt %.

10. The binder composition for the secondary battery positive electrode as set forth in claim 8, wherein carbon atoms of alkyl groups bonding with a non-carbonyl oxygen atom of said (meth)acrylate polymer unit is 4 to 10.

11. The binder composition for the secondary battery positive electrode as set forth in claim 1, wherein a content ratio of said polymer unit having hydrophilic group is 0.05 to 20 wt %.

12. The binder composition for the secondary battery positive electrode as set forth in claim 11, wherein carbon atoms of alkyl groups bonding with a non-carbonyl oxygen atom of said (meth)acrylate polymer unit is 4 to 10.

13. The binder composition for the secondary battery positive electrode as set forth in claim 1, wherein carbon atoms of alkyl groups bonding with a non-carbonyl oxygen atom of said (meth)acrylate polymer unit is 4 to 10.

14. The binder composition for the secondary battery positive electrode as set forth in claim 1, wherein a solubility parameter (SP value) of said binder is 9.0 (cal/cm³)$^{1/2}$ or more and less than 11 (cal/cm³)$^{1/2}$.

15. The binder composition for the secondary battery positive electrode as set forth in claim 1, wherein an iodine value of said binder is 3 to 60 mg/100 mg.

16. The binder composition for the secondary battery positive electrode as set forth in claim 1, wherein a glass transition temperature of said binder is 25° C. or less.

17. A slurry composition for the secondary battery positive electrode comprising a positive electrode active material and the binder composition for the secondary battery electrode as set forth in claim 1.

18. A secondary battery positive electrode wherein the positive electrode active materials made of the slurry composition for the secondary battery positive electrode as set forth in claim 17 is formed on a current collector.

19. A secondary battery comprising a positive electrode, a negative electrode and an electrolytic solution, wherein and said positive electrode is the secondary battery positive electrode as set forth in claim 18.

20. A production method of a secondary battery positive electrode comprising steps of coating and drying the slurry composition for the secondary battery as set forth in claim 17 on at least to one face of the current collector.

21. The positive electrode for the secondary battery as set forth in claim 1, wherein said polymer unit of linear alkylene wherein the linear alkylene has carbon atoms of 4 or more is formed by hydrogenating at least part of a carbon-carbon double bond of a structural unit formed by polymerizing a conjugated diene monomer having carbon atoms of 4 or more.

22. The binder composition for the secondary battery positive electrode as set forth in claim 1, wherein a content ratio of said polymer unit of linear alkylene is 20 to 98 wt %.

* * * * *